US012213393B2

(12) United States Patent
Sandbrook

(10) Patent No.: US 12,213,393 B2
(45) Date of Patent: Feb. 4, 2025

(54) AGRICULTURAL WEED REMOVAL SYSTEM

(71) Applicant: Greentech Robotics Limited, Palmerston North (NZ)

(72) Inventor: Donald H. Sandbrook, Palmerston North (NZ)

(73) Assignee: Greentech Robotics Limited, Palmerston North (NZ)

( * ) Notice: Subject to any disclaimer, the term of this patent is extended or adjusted under 35 U.S.C. 154(b) by 793 days.

(21) Appl. No.: 17/393,591

(22) Filed: Aug. 4, 2021

(65) Prior Publication Data

US 2023/0043631 A1 Feb. 9, 2023

(51) Int. Cl.
  *A01B 63/00* (2006.01)
  *A01M 7/00* (2006.01)
  *A01M 21/02* (2006.01)
  *B25J 5/00* (2006.01)
  *B25J 9/16* (2006.01)

(52) U.S. Cl.
  CPC ......... *A01B 63/002* (2013.01); *A01M 7/0042* (2013.01); *A01M 21/02* (2013.01); *B25J 5/00* (2013.01); *B25J 9/1679* (2013.01)

(58) Field of Classification Search
  CPC .... A10B 63/002; A10B 39/18; A01M 7/0042; A01M 21/02; B25J 5/00; B25J 9/1679; B25J 5/007; B25J 9/0084; B25J 9/1065; B25J 9/162; G05B 2219/45109
  See application file for complete search history.

(56) References Cited

U.S. PATENT DOCUMENTS

| 3,769,782 | A | * | 11/1973 | Cler | A01D 47/00 171/58 |
| 4,663,925 | A | * | 5/1987 | Terada | B25J 5/007 414/730 |
| 4,975,016 | A | * | 12/1990 | Pellenc | A01D 46/30 414/730 |
| 9,149,927 | B2 | * | 10/2015 | Sturm | A61G 7/1046 |
| 10,698,402 | B2 | * | 6/2020 | Kosa | G05D 1/0022 |
| 10,980,174 | B2 | * | 4/2021 | Bassett | A01D 34/822 |
| 11,083,134 | B2 | * | 8/2021 | Bassett | A01D 34/81 |

(Continued)

FOREIGN PATENT DOCUMENTS

| CN | 101990796 A | * | 3/2011 | A01B 39/18 |
| CN | 104773225 A | * | 7/2015 | B25J 5/007 |

(Continued)

OTHER PUBLICATIONS

U.S. Appl. No. 18/063,850, filed Dec. 9, 2022, Donald Sandbrook, Applicant's non-published application.

*Primary Examiner* — Arpad Fabian-Kovacs

(74) *Attorney, Agent, or Firm* — Neustel Law Offices

(57) ABSTRACT

An apparatus for efficient targeting or removal of weeds or other plants. The apparatus may include a vehicle having a frame, a motor and a plurality of ground engaging members adapted to propel the vehicle over a surface. It may also include a robotic arm comprising a distal portion and a proximal portion coupled to the frame, and an implement, such as a tool or hoe connected to the distal portion of the robotic arm. The implement can be raised and lowered, and also moved relative to the surface by the robotic arm by pivoting or rotating the robotic arm at or near the proximal portion.

14 Claims, 31 Drawing Sheets

(56) References Cited

U.S. PATENT DOCUMENTS

| | | | | |
|---|---|---|---|---|
| 11,206,764 | B1* | 12/2021 | Mazor | A01D 46/30 |
| 11,246,256 | B2* | 2/2022 | Snyder | A01B 63/10 |
| 11,470,781 | B2* | 10/2022 | George | A01D 45/26 |
| 11,968,928 | B2* | 4/2024 | Gielis | A01D 46/24 |
| 2005/0126144 | A1* | 6/2005 | Koselka | A01D 46/30 |
| | | | | 56/10.2 R |
| 2006/0213167 | A1* | 9/2006 | Koselka | A01D 75/00 |
| | | | | 56/10.2 A |
| 2012/0277915 | A1* | 11/2012 | Jacobsen | B25J 9/0084 |
| | | | | 700/264 |
| 2012/0304610 | A1* | 12/2012 | Dunn | A01D 47/00 |
| | | | | 56/17.1 |
| 2017/0303470 | A1* | 10/2017 | Briquet-Kerestedjian | |
| | | | | A01D 41/141 |
| 2018/0199502 | A1* | 7/2018 | Briquet-Kerestedjian | |
| | | | | A01D 47/00 |

FOREIGN PATENT DOCUMENTS

| | | | | |
|---|---|---|---|---|
| CN | 110202540 A | * | 9/2019 | B25J 11/00 |
| CN | 115251024 A | * | 11/2022 | A01M 7/0042 |
| WO | WO-0049849 A1 | * | 8/2000 | A01D 45/26 |
| WO | WO-2021112068 A1 | * | 6/2021 | A01D 46/24 |

\* cited by examiner

AGRICULTURAL WEED REMOVAL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to an agricultural weed removal system for removal of undesired plants and weeds, and may be used with weeding robots capable of identifying and eliminating weeds and carrying out thinning for a variety of crops.

Existing weeding means and methods on autonomous agricultural robots are either chemically or mechanically oriented. Existing chemical spray or applicator methods are not well-suited because they are not adept at targeting specific plants for removal. Further, applying chemicals to crops can be undesirable. Existing mechanical means for weed removal are typically large and cumbersome, and require large amounts of power to operate hydraulic or electrical motors. Mechanical systems are also difficult to operate in a manner that avoids desired plants, and they also disturb soil over larger areas than necessary.

SUMMARY

Some of the various embodiments of the present disclosure relate to a weed removal system that can be used in conjunction with an agricultural vehicle, such as, but not limited to, an autonomous agricultural robot or robotic vehicle. The system can be used to precisely remove targeted weeds or undesirable plants, while disturbing only a minimum amount of soil, and leaving desired plants undamaged. Some of the various embodiments of the present disclosure include a vehicle comprising a frame, a motor and a plurality of ground engaging members adapted to propel the vehicle over a surface. The embodiment may also include a robotic arm comprising a distal portion and a proximal portion coupled to the frame, and an implement such as a tool, which may be a circular hoe, connected to the distal portion of the robotic arm. The implement can be raised and lowered relative to the surface by the robotic arm by pivoting the robotic arm at the proximal portion. In some embodiments, a tool is pivotally connected to the robotic arm. In some other embodiments, the tool can be pivotable about a vertical or substantially vertical axis.

According to another aspect, the example weed removal apparatus is adapted for use with a vehicle. The vehicle may be a conventional farm or agricultural vehicle, such as a tractor, or it may be an autonomous, special-purpose vehicle, such as an agricultural robot designed for and dedicated to weed removal and crop thinning. If the latter, the vehicle may be designed with sensors, motors, and systems that enable it to navigate autonomously in a field with a desired crop, and also to remove weeds or other undesirable plants. For example, peripheral sensors on the vehicle can scan and detect the crop rows to enable navigation and general movement of the vehicle.

The vehicle may comprise a frame, a motor, and a plurality of ground-engaging members, which may be wheels, tracks, etc. The vehicle may be an autonomous agricultural vehicle or other vehicle. The frame is preferably adapted to support a load such as one or more robotic arms according to the present disclosure. The frame may also support other equipment useful in agriculture, such as plows, tillers, harrows, seeders, spreaders, etc. The vehicle may further include a variety of systems, instruments, devices, self-contained power sources, solar cells, batteries, transmitters, receivers, electronics, video and/or still cameras, lighting, etc.

In example embodiments, the vehicle is used to mount and propel a robotic arm. The frame may also support one or more wireless transceivers, controllers, processors, logic circuits, etc. to wirelessly receive remote control signals to control the operation of various tools, equipment, and devices on the frame, control steering and drive motors to propel and direct the vehicle, and sense and wirelessly transmit data related to crops, weather, moisture, etc. to a remote data receiver.

According to another aspect, the weed removal apparatus may comprise an actuator coupled to the proximal portion of the robotic arm, the actuator adapted to raise and lower the distal portion of the robotic arm. In some example embodiments of the weed removal apparatus, the actuator comprises a motor, which may be an electric motor. In addition, the proximal portion of the robotic arm can be rotationally coupled to the frame, such that an implement or tool can be moved in a plane that is substantially parallel to the surface.

The robotic arm may comprise a parallel arm assembly, which in turn comprises an upper member and a lower member, the upper member and the lower member pivotally coupled to the frame at the proximal portion and pivotally connected to a connecting member at the distal portion such that the upper member and the lower member remain parallel or substantially parallel to each other when the robotic arm is raised and lowered. In this and other embodiments, the tool is coupled to the connecting member, and an angle of the connecting member relative to the surface does not change when the robotic arm is raised and lowered.

In another aspect, the robotic arm may be operably coupled to a controller adapted to raise and lower the robotic arm. The controller may be coupled to a sensor and also to actuators and to control the robotic arm to target and remove one or more weeds. The robotic arm is or can be rotationally coupled to the frame, such that the tool can move in a first plane when the robotic arm is raised and lowered, and in a second plane when the robotic arm is rotated. The controller is further adapted to rotate the robotic arm. The sensor is operably coupled to the controller, the sensor being adapted to sense the presence of a weed or multiple weeds, wherein the controller is adapted to raise and lower the robotic arm such that the tool can remove the weed.

According to another aspect, the controller is also adapted to rotate the robotic arm such that the tool can remove the weed. The actuator, which raises and lowers the robotic arm, may be a first actuator, and may comprise a first motor, and further, the actuator, which may be a second actuator, may also comprise a motor, which may be a second motor. Either actuator may be an electric or hydraulic motor, etc.

According to another aspect, the robotic arm may comprise a parallel arm assembly. The robotic arm comprises a proximal portion and a distal portion. Generally, the proximal portion is coupled to or mounted on the frame, while the distal portion is coupled (directly or indirectly) to an implement such as a tool, such as a hoe, which may be a circular hoe. In a parallel arm embodiment (others are possible), the robotic arm may comprise an upper member and a lower member.

The upper member and lower member may be mounted at the proximal portion, to the height actuator mount. Specifically, the lower member may be pivotally attached to the mount with a bearing and a bolt, a bushing, a pin, or even a bolt passing through holes in the mount and the member. Similarly, the upper member is attached to the mount, but with an upper member connector, which is driven by an actuator, which causes the upper member to pivot about an axis (e.g., the axis of the actuator).

The upper member and lower member may be pivotally connected at the distal portion of the robotic arm by a connecting member. The distal portions of the upper and lower members can be pivotally connected using bolts, bearings, and nuts, or alternatively, a bushing, a pin, a bolt passing through holes to create a pivot, or any other means or structure for making pivotal connections. If bearings are used, the bearings fit within openings in arms and, and bolts pass through the center of the bearings, allowing the arms and to pivot freely relative to connecting member. An extension through the pivot axes of arms and at the distal portion is parallel to an extension through the pivot axes of the arms at the proximal portion.

Because of this parallel arrangement, when the height of the robotic arm is adjusted to remove a weed or to retract the arm after such removal, the orientation of the tool is maintained. Further, the required geometry is maintained even with significant adjustments of height. Although a parallel arm with a rotational motor is described and illustrated, the height adjustment and geometry could also be maintained with other configurations, such as a linear actuator.

There has thus been outlined, rather broadly, some of the embodiments of the present disclosure in order that the detailed description thereof may be better understood, and in order that the present contribution to the art may be better appreciated. There are additional embodiments of that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

Figure 1A:
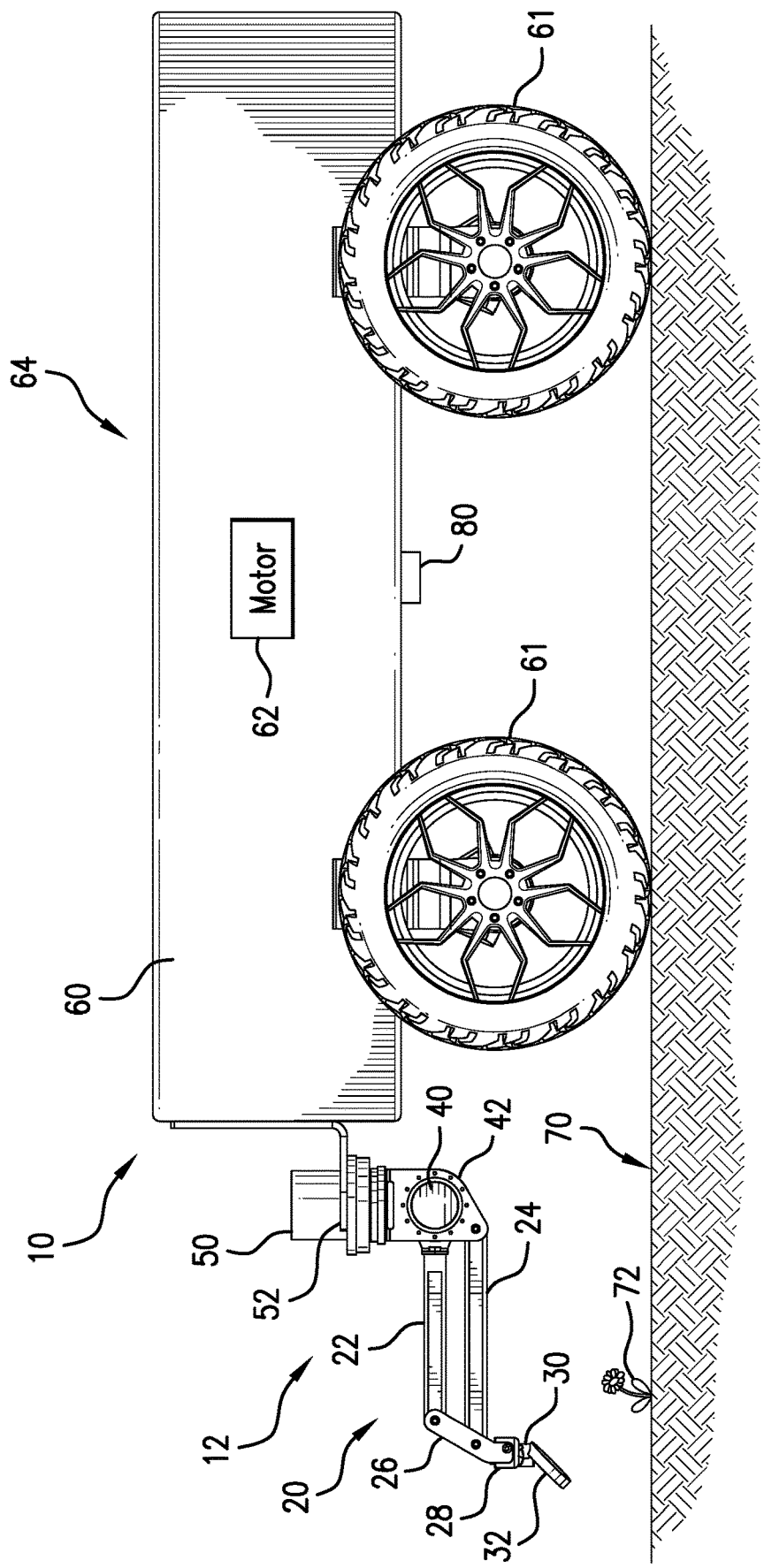
FIG. 1A is a side view of a weed removal system in accordance with an example embodiment.
Figure 1B:
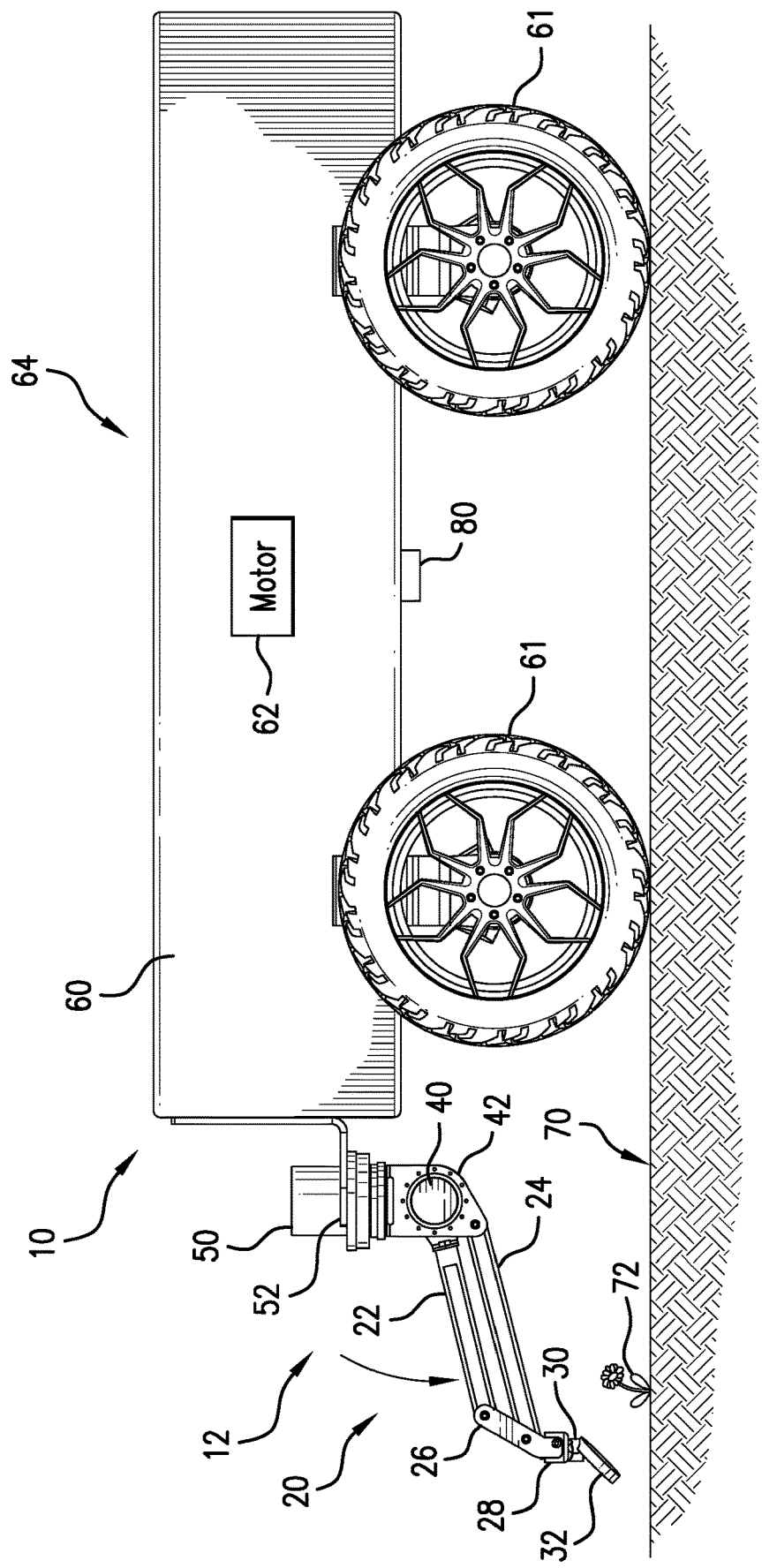
FIG. 1B is another side view of a weed removal system in accordance with an example embodiment.

A. Overview.

Some of the various embodiments of the present disclosure relate to a weed removal apparatus 10 that can be used in conjunction with an agricultural vehicle 64, such as, but not limited to, an autonomous agricultural robot or robotic vehicle. The system can be used to precisely remove targeted weeds or undesirable plants, while disturbing only a minimum amount of soil, and leaving desired plants undamaged. Some of the various embodiments of the present disclosure include a vehicle 64 comprising a frame 60, a motor 62 and a plurality of ground engaging members 61, which may be wheels or other elements, adapted to propel the vehicle 64 over a surface 70. The embodiment may also include a robotic arm 12 comprising a distal portion 16 and a proximal portion 14 coupled to the frame 60, and an implement such as tool 32 (such as a circular hoe, for example) or a spray head 102 connected to the distal portion 16 of the robotic arm 12. The tool 32 or spray head 102 can be raised and lowered relative to the surface 70 by the robotic arm 12 by pivoting the robotic arm 12 at the proximal portion 14. In some embodiments, the implement is a tool 32 that is pivotally connected to the robotic arm 12. In some other embodiments, the tool can be pivotable about a substantially vertical axis. It is not critical that the tool axis is vertical, however, as angles other than vertical will still allow the apparatus 10 to function as described herein.

In some example embodiments, the lower end of the tool 32 is offset from the vertical or substantially vertical axis such that the tool 32 can pivot as a result of a force on the lower end of the tool when the tool 32 is in contact with the surface 70 and is in motion relative to the surface 70. In some embodiments of the weed removal apparatus, the tool 32 comprises a flat ring shape. Further, the tool 32 can be connected to the robotic arm 12 by a clamp 30 such that the tool 32 can be rotationally repositioned in the clamp 30.

In some example embodiments, an implement on the end of robotic arm 12 is a spray head 102, such as a micro dosing spray head. The robotic arm in such an embodiment provides similar advantages to those where a tool is connected to the arm, because the spray can be maintained in a vertical or substantially vertical orientation. Further, the spray head 102 can be positioned precisely relative to the target plant (i.e., a weed or a crop to be thinned).

The weed removal apparatus may further comprise an actuator 40 coupled to the proximal portion 14 of the robotic arm 12, the actuator 40 adapted to raise and lower the distal portion 16 of the robotic arm. In some example embodiments of the weed removal apparatus, the actuator 40 comprises a motor, which may be an electric motor. In addition, the proximal portion 14 of the robotic arm 12 can be rotationally coupled to the frame 60, such that the tool 32 can be moved in a plane substantially parallel to the surface 70.

The robotic arm 12 may comprise a parallel arm assembly 20, which in turn comprises an upper member 22 and a lower member 24, the upper member 22 and the lower member 24 pivotally coupled to the frame 60 at the proximal portion 14 and pivotally connected to one or more connecting members 26 at the distal portion 16 such that the upper member 22 and the lower member 24 remain parallel to each other when the robotic arm 12 is raised and lowered. In this and other embodiments, the tool 32 is coupled to the connecting members 26, and an angle of the connecting members 26 relative to the surface 70 does not change when the robotic arm 12 is raised and lowered.

The robotic arm 12 may be operably coupled to a controller 90 adapted to raise and lower the robotic arm 12. The controller 90 may be coupled to a sensor 80 and also to actuators 40 and 50 to control the robotic arm to target one or more weeds 72, wherein targeting a weed can include removing it physically or spraying it. If a spray head 102 is used on the robotic arm 12, the controller 90 can place the spray nozzle at a target height above a specific weed type (e.g., a given distance above a weed regardless of how tall the weed is), or at a fixed height above the ground, even when the contour of the surface is accounted for.

The robotic arm 12 is or can be rotationally coupled to the frame 60, such that the implement can move in a first plane when the robotic arm 12 is raised and lowered, and in a second plane when the robotic arm 12 is rotated. The controller is further adapted to rotate the robotic arm. The sensor 80 is operably coupled to the controller 90, the sensor 80 being adapted to sense the presence of a weed 72 or multiple weeds 72, wherein the controller 90 is adapted to raise and lower the robotic arm 12 such that a tool 32 or other implement can remove or target the weed 72. In addition, the controller can be used such that the tool 32 follows the contour of the ground to maintain the tool at a consistent depth. The controller 90 is also adapted to rotate the robotic arm 12 such that the tool 32 or other implement can remove or target the weed 72. The actuator 40, which raises and lowers the robotic arm 12, may be referred to as a first actuator, and may comprise a first motor, and further, the actuator 50, which may be referred to as a second actuator, may also comprise a motor, which may comprise a second motor. Either actuator may be an electric or hydraulic motor, etc.

B. Vehicle.

The example weed removal apparatus 10 is adapted for use with a vehicle 64. The vehicle 64 may be a conventional farm or agricultural vehicle, such as a tractor, or it may be an autonomous, special-purpose vehicle, such as an agricultural robot designed for and dedicated to weed removal and crop thinning. If the latter, the vehicle 64 may be designed with sensors, motors, and systems that enable it to navigate autonomously in a field with a desired crop, and also to remove weeds or other undesirable plants. For example, peripheral sensors on the vehicle 64 (not shown) scan and detect the crop rows to enable navigation and general movement of the vehicle 64.

The vehicle 64 may comprise a frame 60, a motor 62, and a plurality of ground-engaging members 61, which may be wheels, tracks, etc. The vehicle 64 may be an autonomous agricultural vehicle or other vehicle. The frame 60 is adapted for attachment of one or more robotic arms 12. The vehicle may further include a variety of systems, controllers, sensors, instruments, devices, self-contained power sources, solar cells or panels, batteries, transmitters, receivers, electronics, video and/or still cameras, lighting, etc.

In example embodiments, the vehicle 64 is used to mount and propel robotic arm 12. The vehicle 64 may also include one or more wireless transceivers, controllers, processors, logic circuits, etc. to wirelessly receive remote control signals to control the operation of various tools, equipment, and devices on the frame 60, control steering and drive motors (including motor 62) to propel and direct the vehicle 64, and sense and wirelessly transmit data related to crops, weather, moisture, etc. to a remote data receiver.

In the example embodiment best illustrated in FIGS. 1A-1E, the vehicle 64 is shown, comprising an elongated frame 60, held above surface 70 by the plurality of ground-engaging members 61. The ground-engaging members 61 may be driven by a motor 62, or a plurality of individual motors. The vehicle may also comprise steering motors and other mechanism to enable the vehicle 64 to autonomously navigate a field having both desirable crops as well as weeds 72 to be removed. The vehicle 64 may also include a sensor 80 (or multiple sensors or a sensor system) to sense the presence of weeds 72 that are to be removed. The sensor 80 may be an optical or video sensor, for example.

The sensor 80 may be mounted on frame 60 as shown in FIGS. 1A-1E, or it may be mounted in other locations, such as on robotic arm 12. In the figures, frame 60 is represented as an elongated frame, upon which the various components mentioned above can be mounted or installed. However, the shape and proportions shown does not limit the example embodiments described herein and has no impact on understanding the features of the example embodiments described herein.

The frame 60 is supported and suspended above and in movable contact with the surface 70 by the plurality of ground-engaging members 61, e.g., wheels connected to the frame 60. In addition to motion caused directly by actuators 40 and 50, the forward motion of the vehicle 64, illustrated by the motion arrow in FIGS. 1C and 1D, allows the apparatus 10, and more particularly, robotic arm 12, to remove weeds when the tool 32 is lowered, as also illustrated by FIGS. 1C and 1D when considered in sequence.

While the frame 60 is illustrated in FIGS. 1A-1E as an elongated linear frame, that is merely one example configuration. It is contemplated and will be appreciated that the frame 60 may have numerous other and different configurations that are consistent with the objectives and functionality of the example embodiments as described herein. As additional examples, the frame 60 may comprise an elongated non-linear member, or a plurality of elongated interconnected linear and/or non-linear members. The frame 60 may also comprise a multi-member or monolithic closed or open frame structure. The frame structure may have numerous shapes including square, rectangular, and other geometric shapes. The frame 60 may be substantially planar or may be three dimensional. The frame 60 also may comprise a partially or wholly solid structure and the structure may have various shapes in either two or three dimensions. All such variations and others that are consistent with the purposes and functions of the frame 60 as described herein are intended to be included.

C. Robotic Arm.

The example weed removal apparatus 10 includes one or more robotic arms 12, coupled to or mounted on frame 60 of vehicle 64. In an example embodiment, two robotic arms 12 may be mounted on frame 60, as shown in FIGS. 1-3 and 16A-16D, for example, but perhaps best shown in FIGS. 2-3 and 16A-16D. The details of the robotic arm 12 are shown in FIGS. 4-11. As shown, the robotic arm 12 can be mounted on frame 60 by rotator actuator mount 52. Mount 52 couples the robotic arm 12 to the frame 60 via actuator 50. As mentioned, actuator 50 may be a motor, such as an electrical or hydraulic motor. In addition, actuator 50 may be in other forms than the one shown in the figures. As indicated by reference to FIGS. 2 and 3, the actuator 50 may cause the robotic arms 12 to rotate, which causes tools 32 to move in a plane substantially parallel to surface 70.

This rotational motion can, obviously, be accomplished while the entire vehicle 64 is in motion, which allows for the tools 32 at the distal portions 16 of robotic arms 12 to move into position to engage and remove one or more weeds. As mentioned briefly above, the motion and positioning required may be determined by one or more sensors 80, in conjunction with a controller 90, which can control the rotational and elevational position of the robotic arms 12 dynamically.

Figure 8:
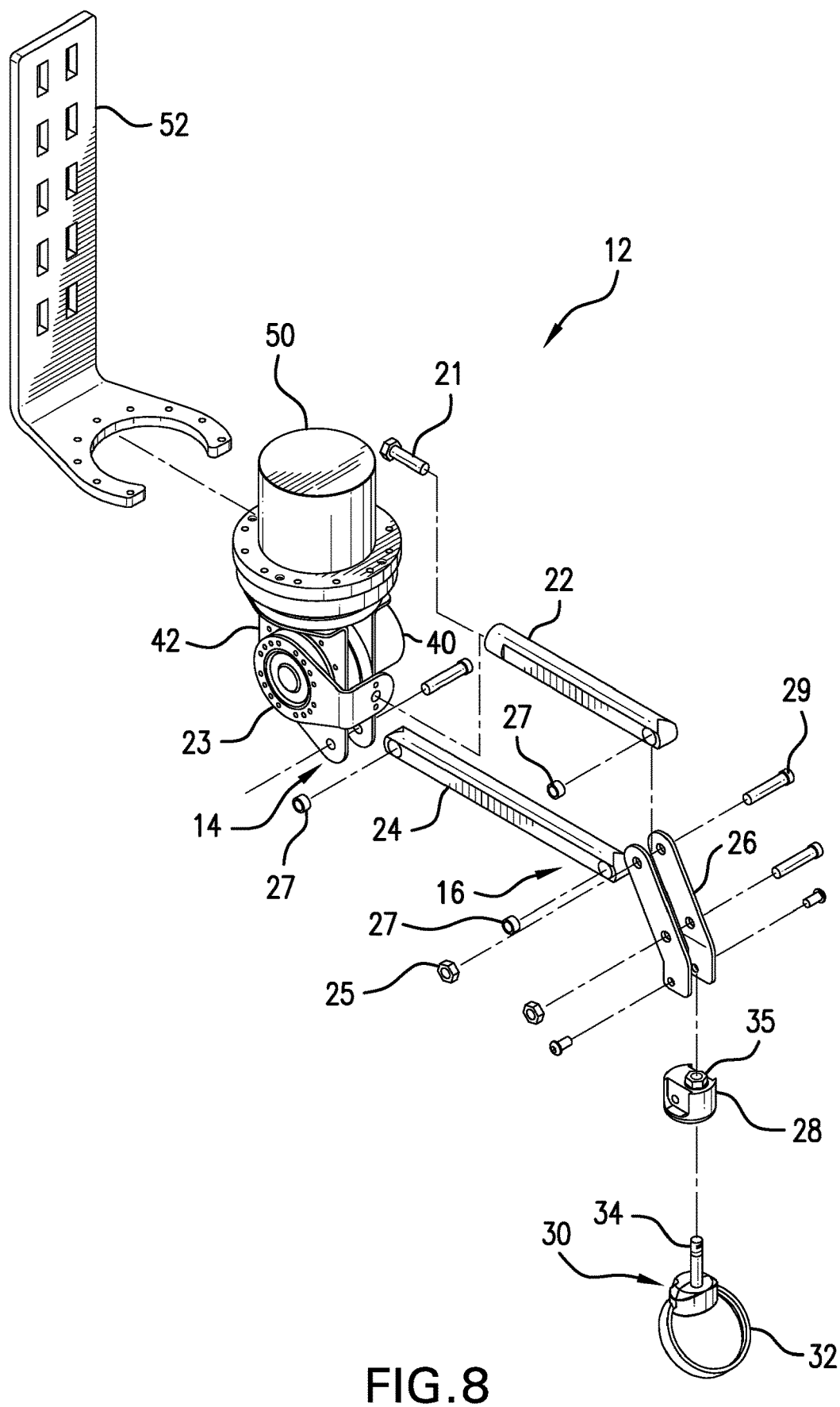
FIG. 8 is an exploded, perspective view of a robotic arm usable with a weed removal system in accordance with an example embodiment.
Figure 9:
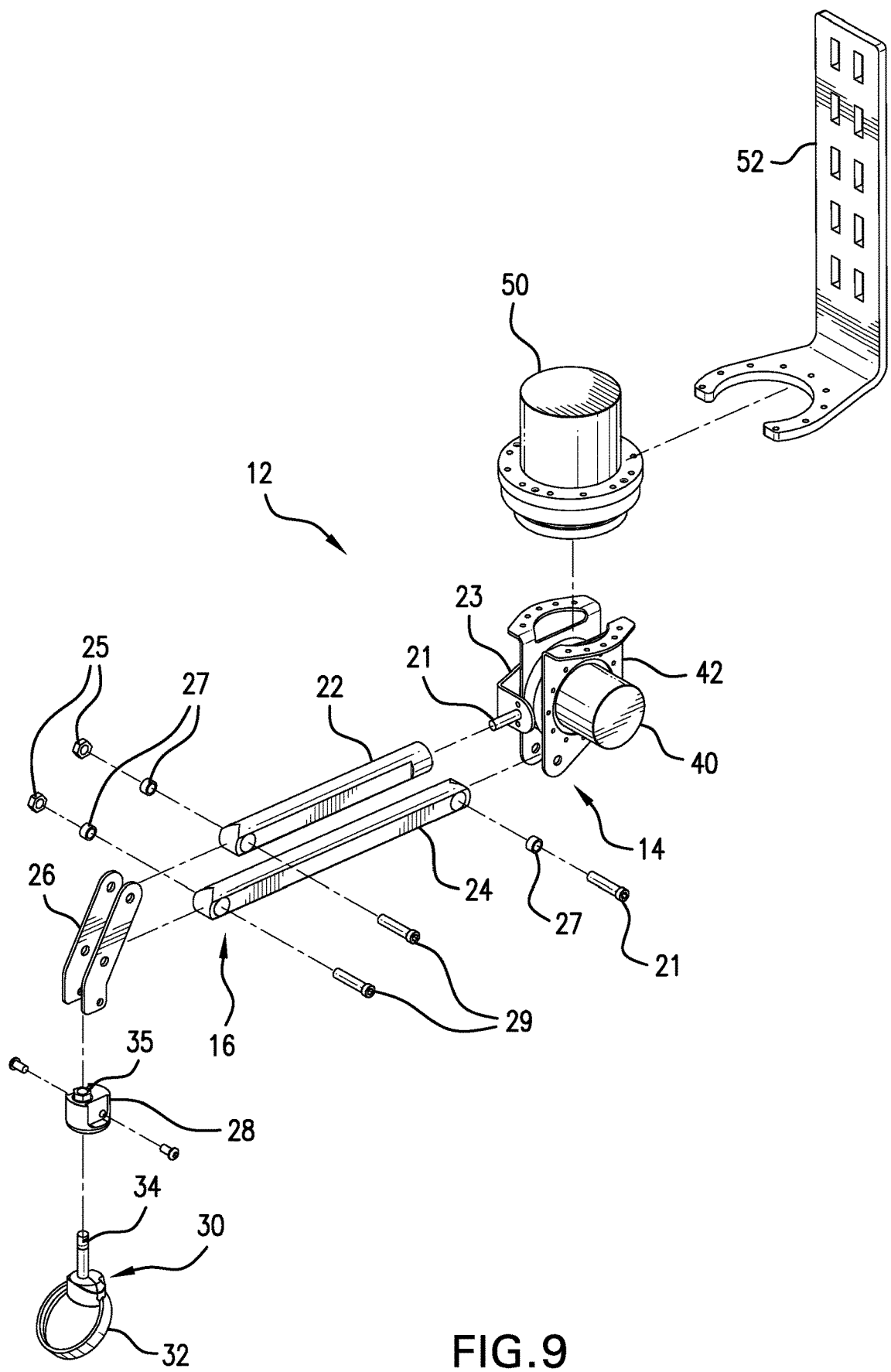
FIG. 9 is another exploded, perspective view of a robotic arm usable with a weed removal system in accordance with an example embodiment.
Figure 10:
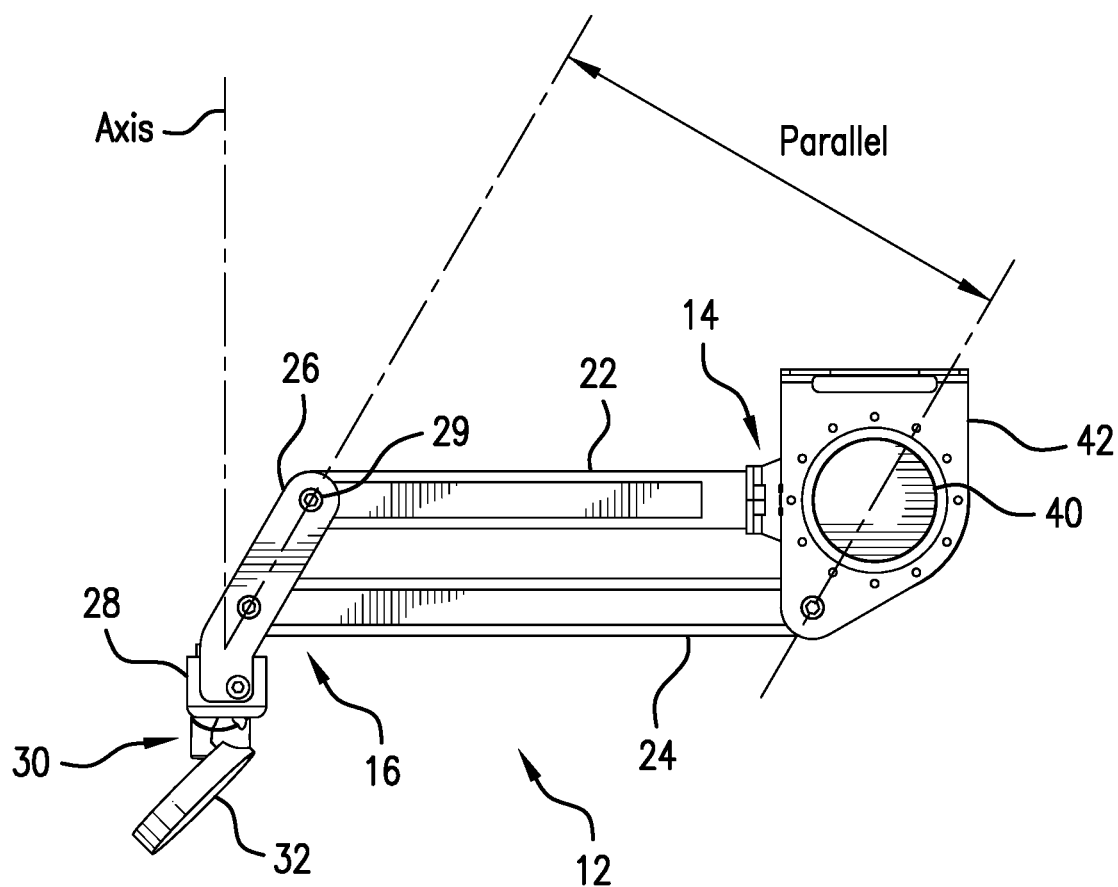
FIG. 10 is a side view of a robotic arm usable with a weed removal system in accordance with an example embodiment.
Figure 11:
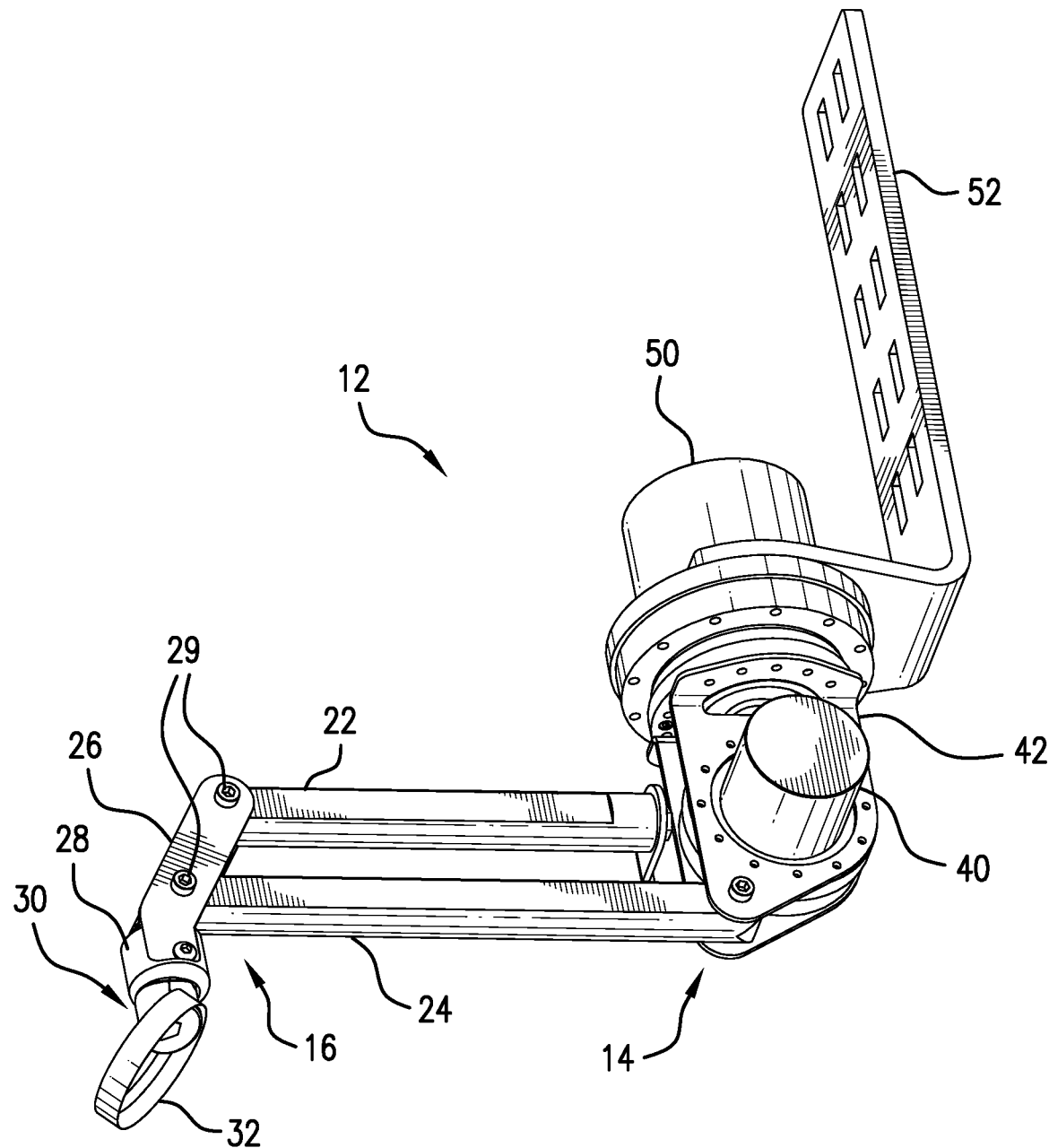
FIG. 11 is a bottom, perspective view of a robotic arm usable with a weed removal system in accordance with an example embodiment.

Actuator 50 rotates the entire robotic arm 12, and specifically, parallel arm assembly 20, by rotating height actuator mount 42, as can be seen in FIGS. 8-9 and 11. As shown, actuator 50 is attached to the actuator mount 52 such that the motor does not rotate relative to the mount 52, but mount 42 and, correspondingly, actuator 40, does rotate. FIG. 10 shows, in isolation, the portion of robotic arm 12 that rotates when actuator 50 is driven.

As best shown in FIGS. 1A-1E and FIGS. 4, 6, and 8, the robotic arm 12 is also coupled to the frame 60 by a height actuator mount 42 that is coupled to and driven by actuator 50. Notably, height actuator mount 42 is operable independently of actuator 50, such that the distal portion 16 of the robotic arm can be both rotated and elevated to any position within the range of motion possible, which is shown generally throughout the figures, although the design can be modified for different ranges of motion as well.

The robotic arm 12 may comprise a parallel arm assembly 20 as indicated in FIG. 1A-1E and FIG. 10 and as best shown in FIGS. 1A-1E and 4-11. As illustrated in FIG. 10, the robotic arm comprises a proximal portion 14 and a distal portion 16. Generally, the proximal portion 14 is coupled to or mounted on the frame 60, while the distal portion 16 is coupled (directly or indirectly) to a tool 32, such as a circular hoe. In a parallel arm embodiment (others are possible), the robotic arm 12 may comprise an upper member 22 and a lower member 24.

The upper member 22 and lower member 24 may be mounted at the proximal portion 14, to the height actuator mount 42. Specifically, the lower member 24 may be pivotally attached to the mount 42 with a bearing 27 and a bolt 21, as best shown in FIG. 9. As discussed above, other structures for making pivotal connections, such as bolts, pins, bushings, etc., may also be used. Similarly, the upper member 22 is attached to the mount 42, but with an upper member connector 23, which is driven by actuator 40, which causes the upper member 22 to pivot about an axis—in other words, upper member connector 23 rotates when actuator 40 is commanded to rotate, and as a result, upper member 22 moves as if pivoted at the center of actuator 40. The proximal end of upper member 22 can be attached to upper member connector 23 with a bolt 21 that passes through the connector 23 and threads into the end of upper member 22, as shown for example in FIGS. 8 and 9.

The upper member 22 and lower member 24 may be pivotally connected at the distal portion 16 of the robotic arm 12 by a pair of connecting members 26. The distal ends of members 22 and 24 are pivotally connected using any sufficient means or devices, including bolts 29, bearings 27, and nuts 25, as best shown in FIGS. 8 and 9. As shown, the bearings 27 fit within openings in members 22 and 24, and bolts 29 pass through the center of the bearings 27, allowing the members 22 and 24 to pivot freely within connecting members 26. As shown in FIG. 10, an extension through the pivot axes of members 22 and 24 at the distal portion 16 is parallel to a similar extension through the pivot axes of the arms at the proximal portion. As explained below and shown in the figures, this parallel relationship, combined with the parallel arrangement of members 22 and 24, ensures that the vertical or substantially vertical axis of tool 32 remains at a substantially constant angle relative to the surface.

Figure 6:
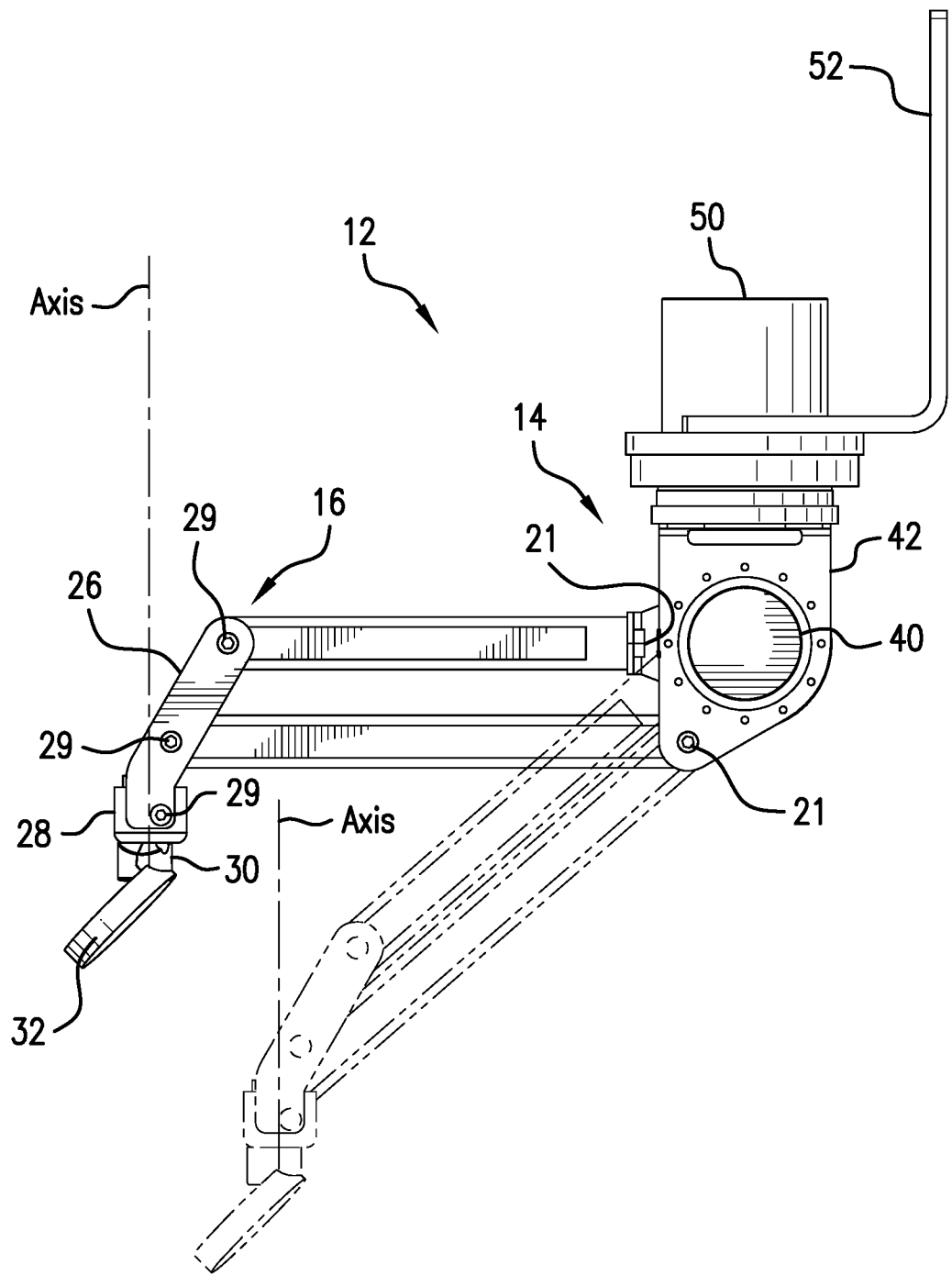
FIG. 6 is a side view of a robotic arm usable with a weed removal system in accordance with an example embodiment.

Because of the pivotal connections shown, when upper member 22 is rotated by actuator 40, the entire parallel arm assembly 20 is raised or lowered, as shown in FIG. 6, for example. This occurs because the lower member 24 is also pivotally connected at its distal end to the upper member 22, with connecting members 26.

Because of the parallel arrangement of upper member 22 and lower member 24, and the parallel nature of their pivotal axes, as illustrated in FIG. 10, when the height of the robotic arm 12 is adjusted to remove a weed or to retract (raise) the arm after such removal, the angular orientation of the axis of tool 32 is maintained. This is best shown in FIG. 6, which illustrates how the axis of tool 32 stays substantially vertical, at the same angle relative to the surface, regardless of the elevation of the arm 12. The angle relative to surface 70 is also shown in FIGS. 1A-1E. Further, the geometry—specifically, the constant or substantially constant angle of the axis of tool 32, can be maintained even with significant adjustments of height. Although a parallel arm assembly with a rotational motor is described and illustrated, the height adjustment and geometry shown could also be maintained with other configurations, such as a linear actuator. Further, it is not critical that the tool axis remains constant for all positions or elevations of the robotic arm 12. For example, the axis could tilt when the arm 12 is raised, and tilt again so that the tool axis is substantially vertical when the tool 32 engages the ground. The same relationships hold if the implement used with the robotic arm 12 is a spray head 102, in which case the spray head 102 maintains its orientation regardless of the height of the robotic arm 12.

Figure 13:
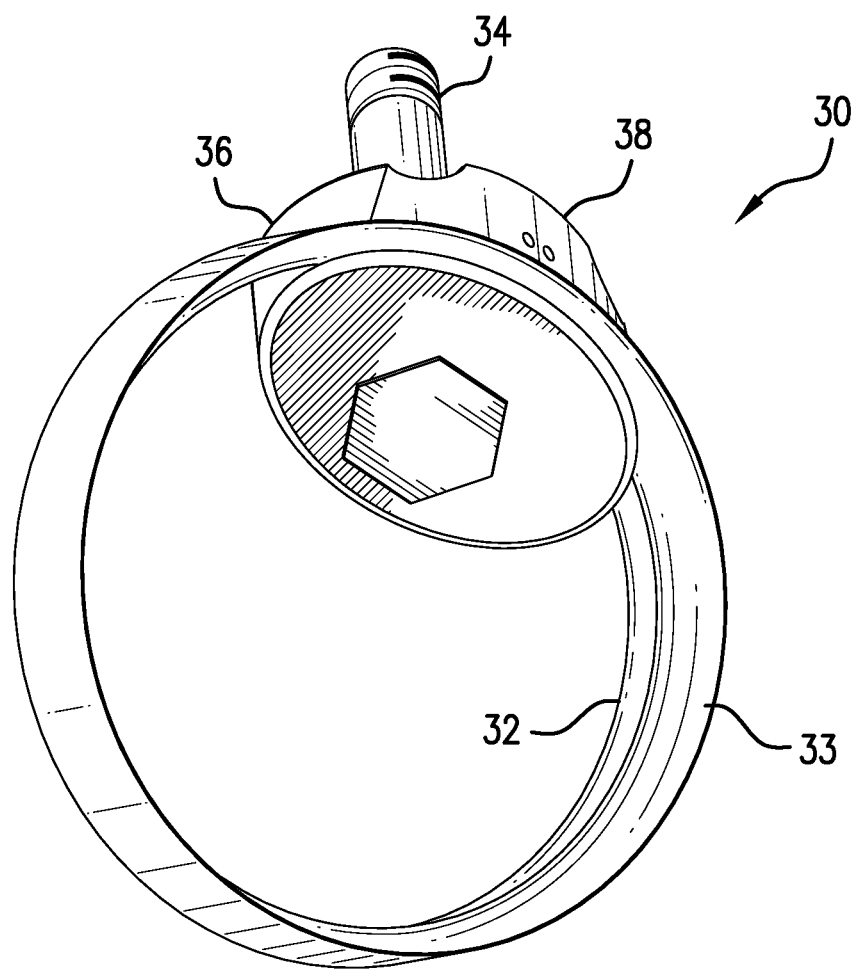
FIG. 13 is a lower perspective view of a circular hoe usable with a weed removal system in accordance with an example embodiment.

At the bottom of connecting members 26, proximate the distal portion 16 of robotic arm 12, there is an implement holder 28, which may be attached to and act as a spacer between the connecting members 26. The connections are best shown in FIGS. 8 and 9. The implement holder 28 also comprises a hole through which the shaft 34 of tool clamp 30 passes. As will be discussed in detail, the shaft 34 is rotationally mounted in the implement holder 28, which allows the tool 32 to change its orientation with respect to the vertical axis defined by shaft 34. A nut 35 is threaded onto the top of shaft 34 to secure the tool 32 and tool clamp 30 in place. As shown in FIG. 13, the shaft 34 may be or be similar to an elongated bolt, with a hexagonal head at one end and threads at the other end. Further, the tool clamp 30 may be sized and shaped to hold the shaft 34 securely, as also shown.

D. Tool & Spray Head.

Figure 24:
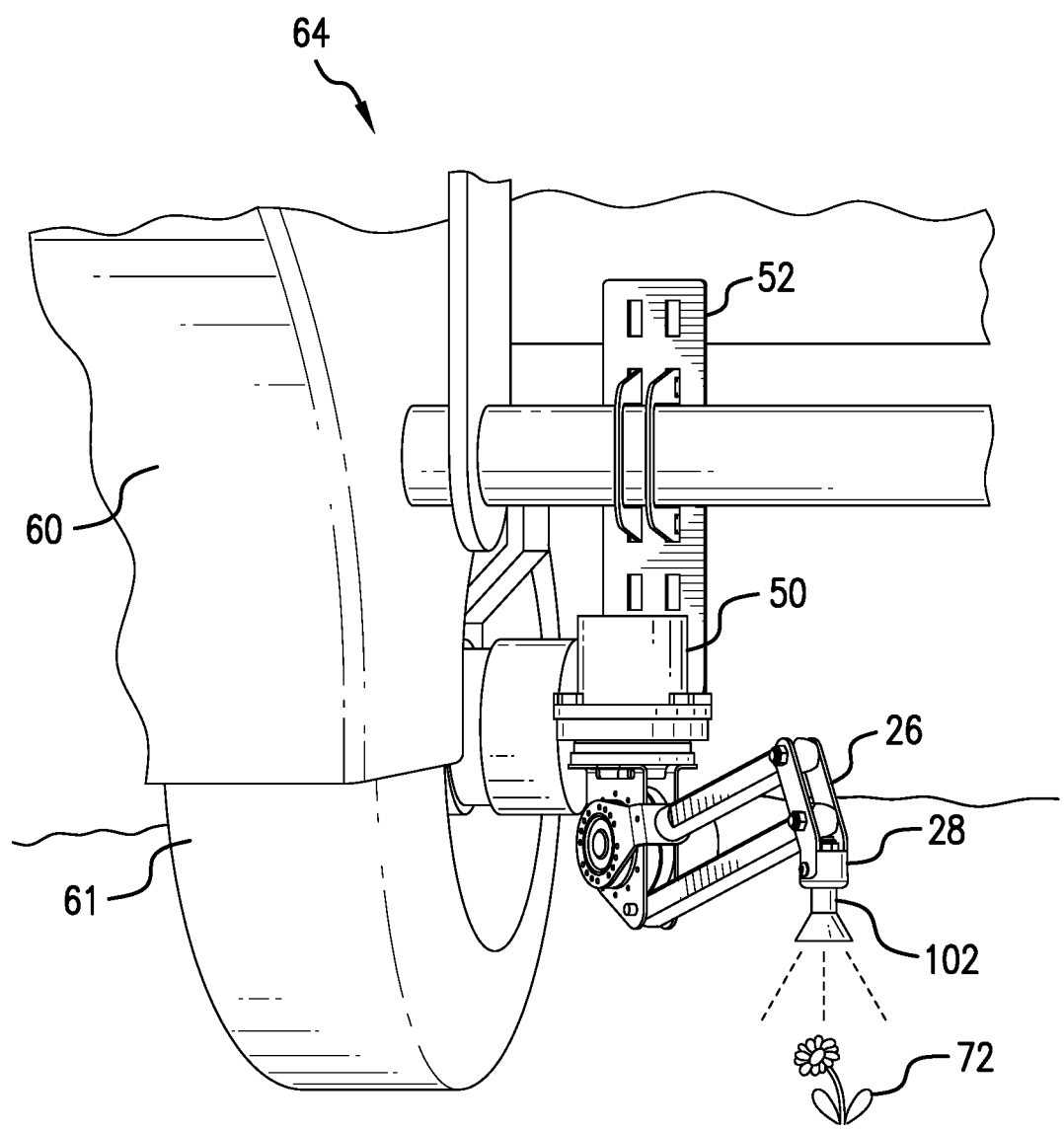
FIG. 24 is another perspective view of a weed removal system in accordance with an example embodiment.

As shown in the figures, the example weed removal apparatus 10 can comprise an implement, such as tool 32 (which may be a circular hoe or other tool) coupled to the distal portion 16 of robotic arm 12. While a circular hoe is shown, other hoes or implements are also usable with the example embodiments. For example, the weeding tool could be in the form of a hook (incomplete circle), oval, square, rectangle, etc., and still provide the same functionality described herein. As another example, the implement attached to robotic arm 12 can be a spray head 102, as shown in FIG. 24, usable to spray weeds precisely, with the spray head 102 being positionable directly above, or relative to, a weed 72, thus targeting the weed 72 or a crop to be thinned, for removal.

If a tool is used, the tool 32 may comprise a circular hoe, and it may have a beveled leading edge 33, as shown in FIGS. 12A-12D and 13. By having only the leading edge beveled, a stronger and more compact form results, as the strength is maintained in the tool by having a thicker upper portion. However, the trailing edge could also be beveled, which would allow for reversal of the circular hoe in the tool clamp 30 one the leading edge 33 becomes worn. Using two beveled edges thus may require a tool 32 made of a different material or bulkier form, or may result in a reduction of strength.

Figure 12A:
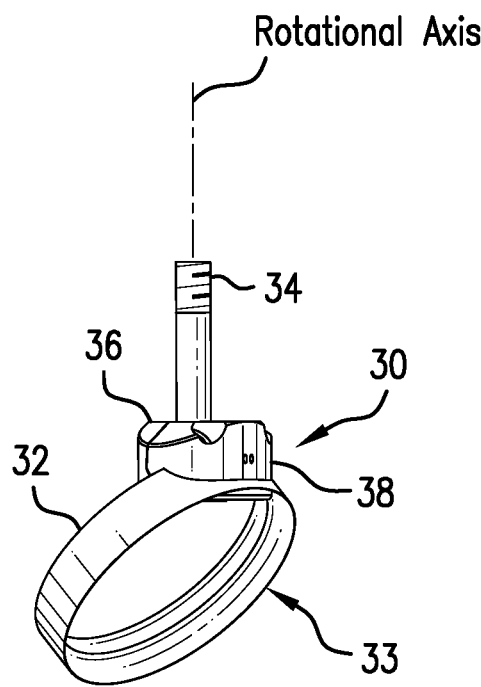
FIG. 12A is a perspective view of a circular hoe usable with a weed removal system in accordance with an example embodiment.
Figure 12B:
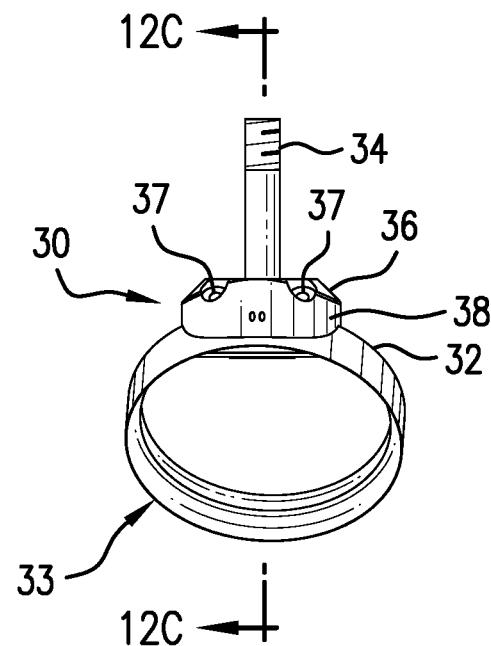
FIG. 12B is another perspective view of a circular hoe usable with a weed removal system in accordance with an example embodiment.
Figure 12C:
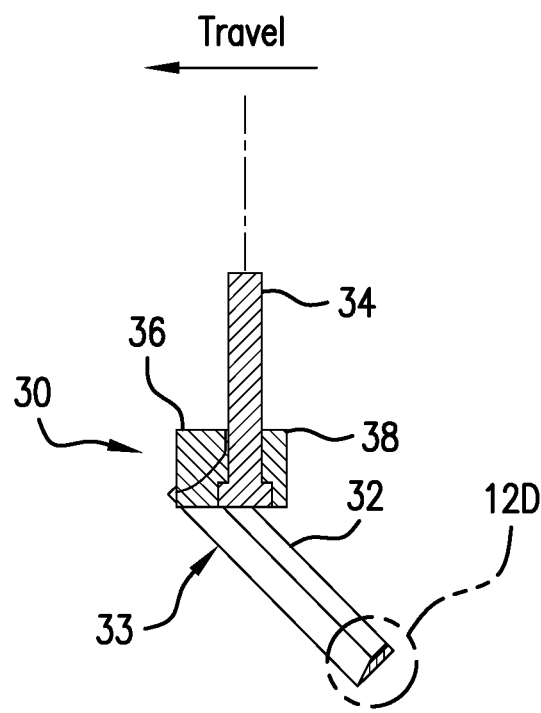
FIG. 12C is a sectional view taken at line 12C-12C in view 12B, of a circular hoe usable with a weed removal system in accordance with an example embodiment.
Figure 12D:
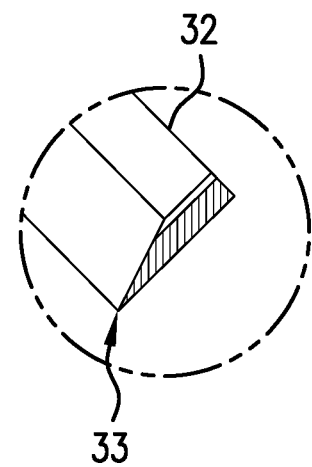
FIG. 12D is a detail view of a portion of a circular hoe tool usable with a weed removal system in accordance with an example embodiment.

FIG. 12C shows a cross-sectional view of the beveled edge 33 of tool 32, and FIG. 12D shows the same portion of the view in greater detail. The bevel direction ensures that the sharper portion of the tool 32 is available to displace the soil in front of a weed and efficiently remove the weed and its roots.

The tool 32 is held in place by a tool clamp 30, which is comprised of an upper tool clamp 38 and a lower tool clamp 36, which can be held together by fasteners 37, such as screws, as shown in FIGS. 12A-12D and FIG. 14. The tool 32 is mounted in clamp 30 at an offset angle, such that the lowest point of the tool 32 is spaced apart from the axis of the pivotally mounted tool, as best shown in FIG. 12C. It is this low point of tool 32 that would be in contact with the ground when the robotic arm 12 is lowered to engage the ground, as shown in FIG. 1C. Because the tool 32, or other tool, is free to rotate, it will automatically align in the direction of travel of the rotational axis. This action is comparable to a caster wheel on a shopping cart, for example, where the rotational axis is also off center from the contact point of the bottom of the wheel, resulting in self-alignment. Notably, the effective path of the tool is controlled by the rotation of the arm 12 in combination with the forward travel of the entire apparatus, not just one or the other. Accordingly, the tool's path may be substantially in the direction of travel of vehicle 64, or it may be transverse to the direction of travel, or it may follow any angle or arc possible given differences in speed of the vehicle 64 and the rotation and elevation of robotic arm 12.

Figure 2:
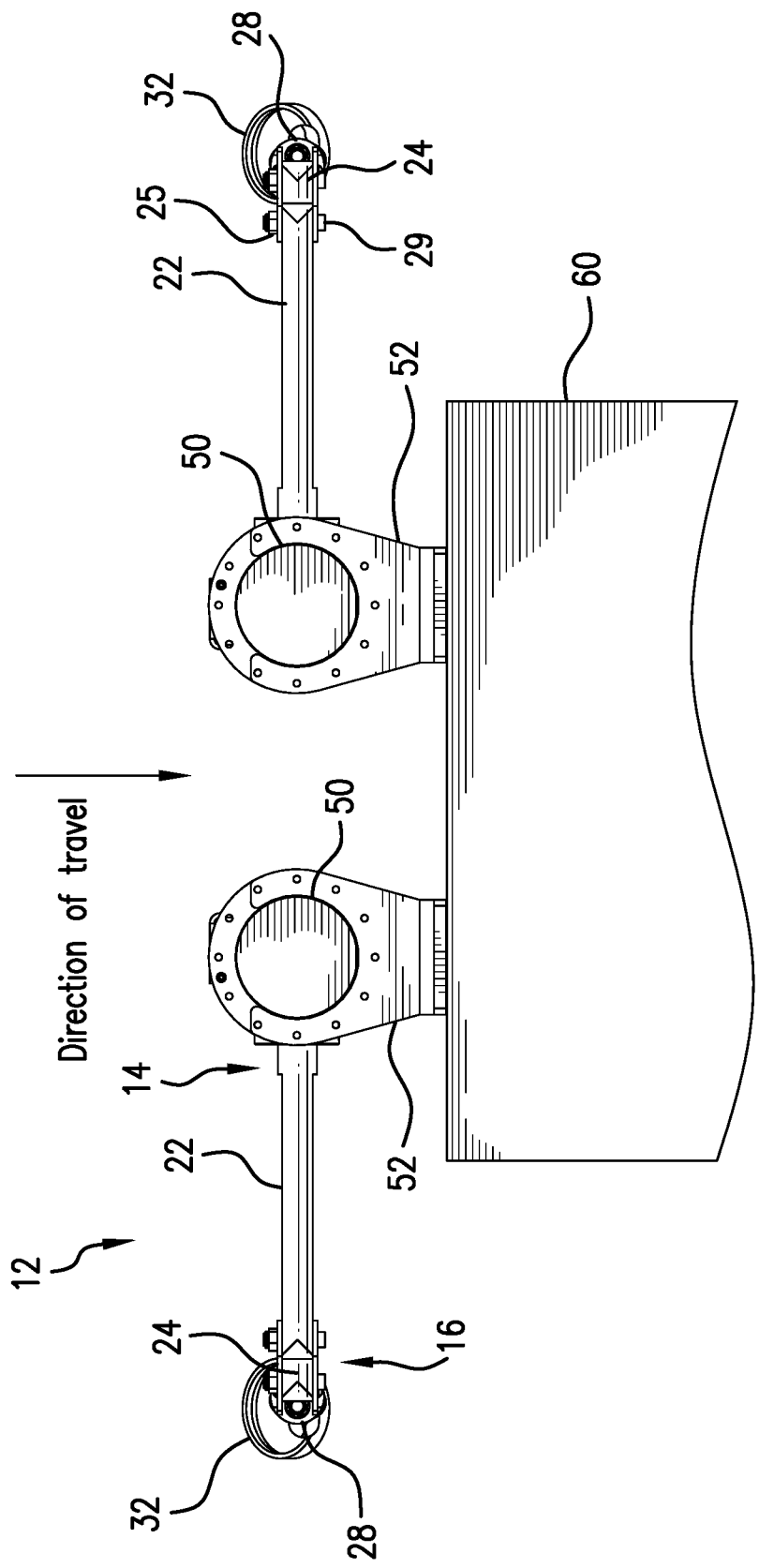
FIG. 2 is a top view of a weed removal system in accordance with an example embodiment.
Figure 7A:
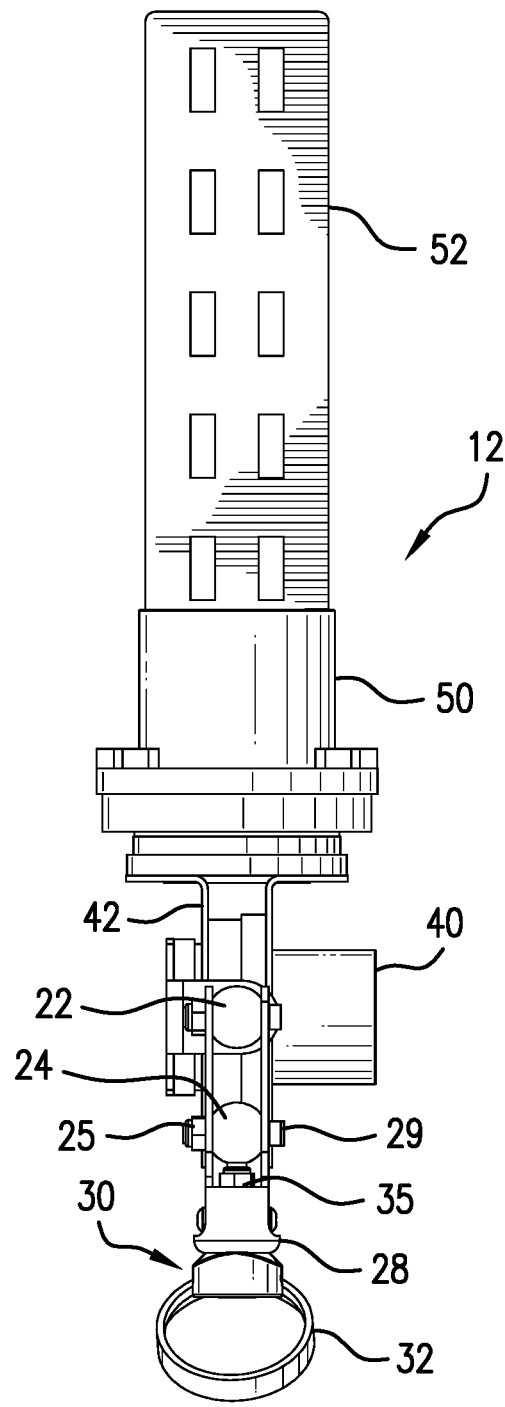
FIG. 7A is a rear view of a robotic arm usable with a weed removal system in accordance with an example embodiment.
Figure 7B:
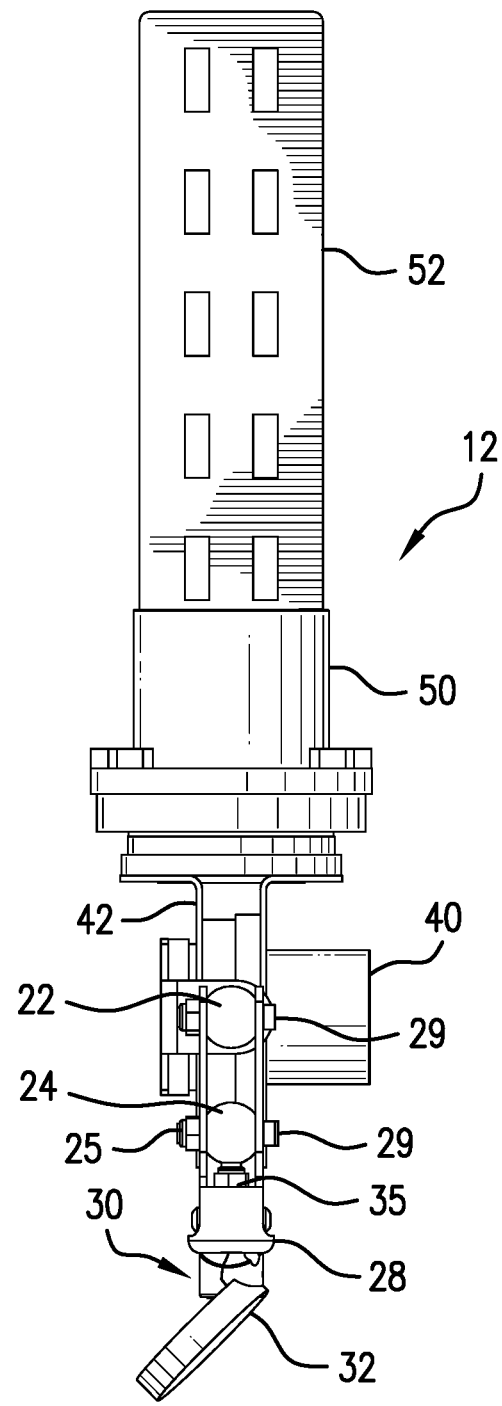
FIG. 7B is another rear view of a robotic arm usable with a weed removal system in accordance with an example embodiment.
Figure 16A:
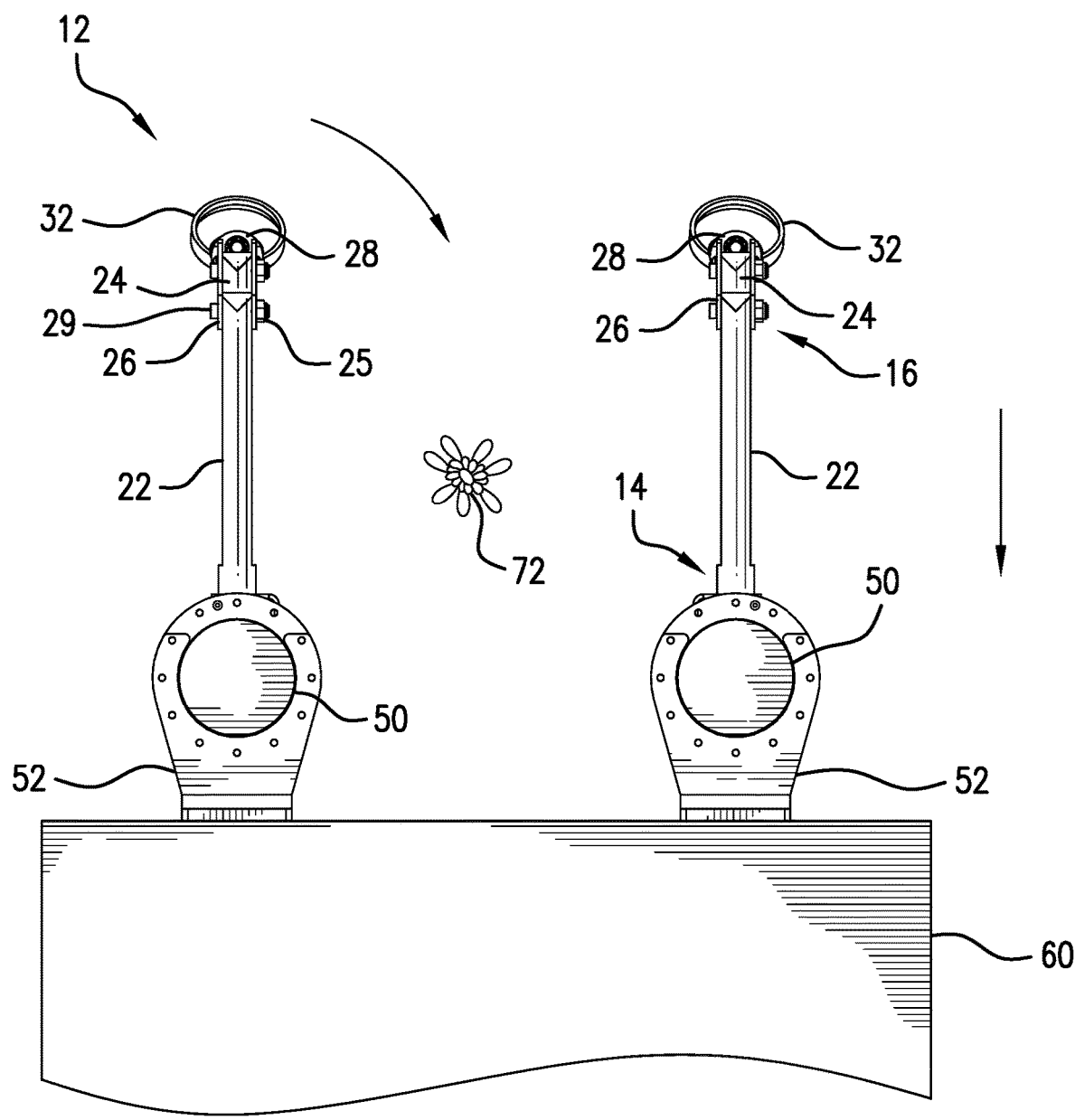
FIG. 16A is a top view of a weed removal system in use in accordance with an example embodiment.
Figure 16B:
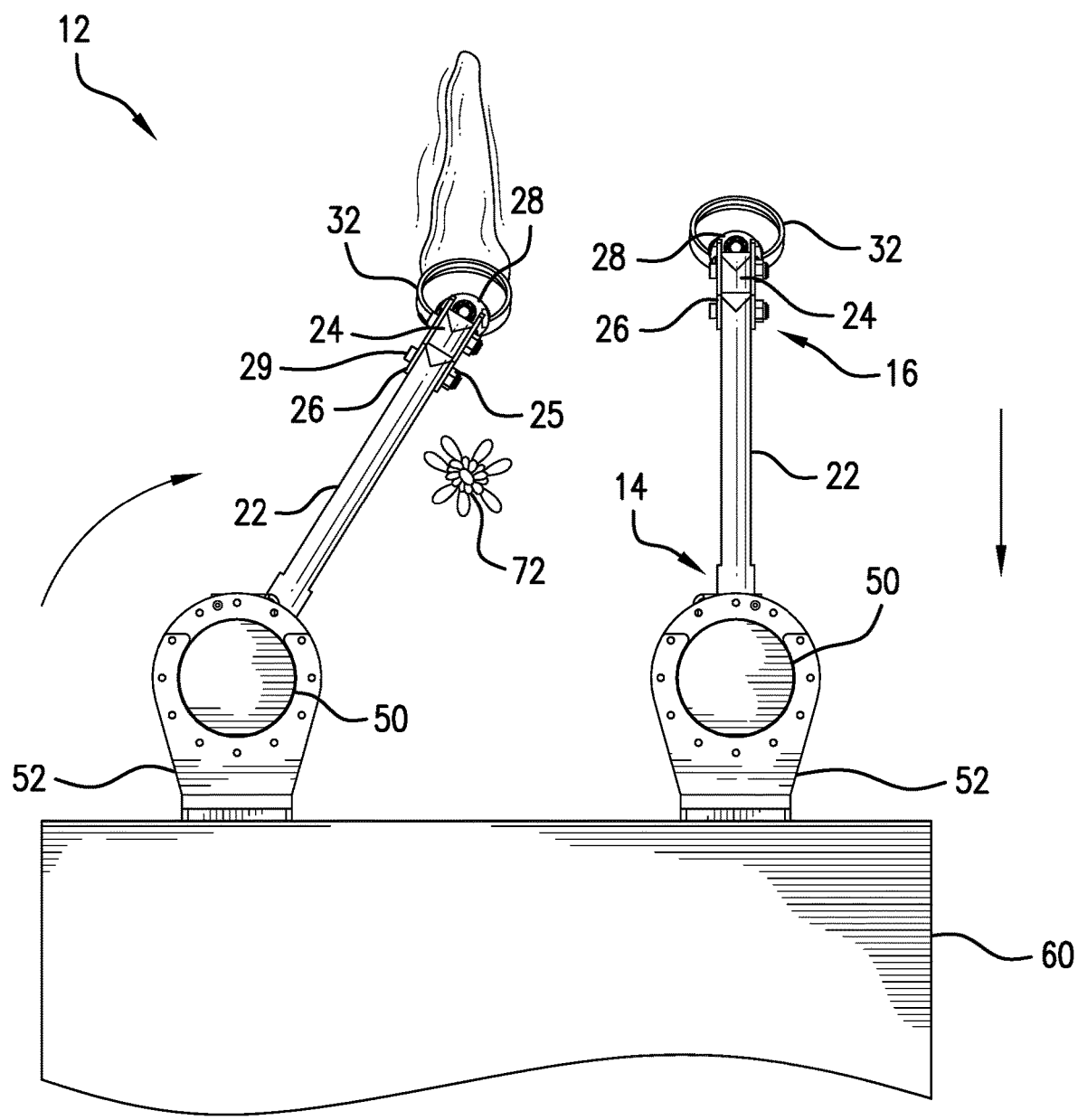
FIG. 16B is another top view of a weed removal system in use in accordance with an example embodiment.
Figure 16C:
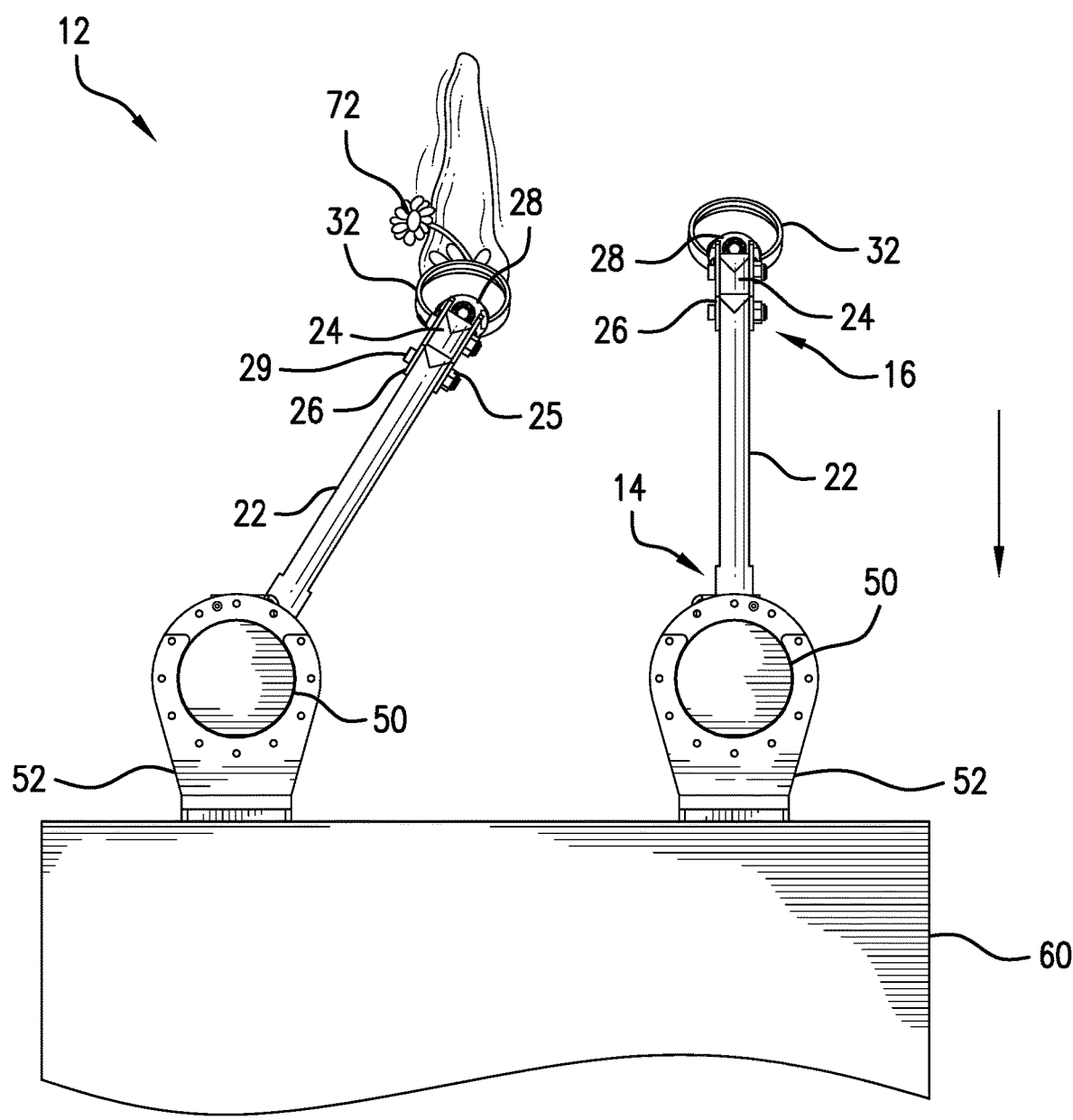
FIG. 16C is another top view of a weed removal system in use in accordance with an example embodiment.
Figure 16D:
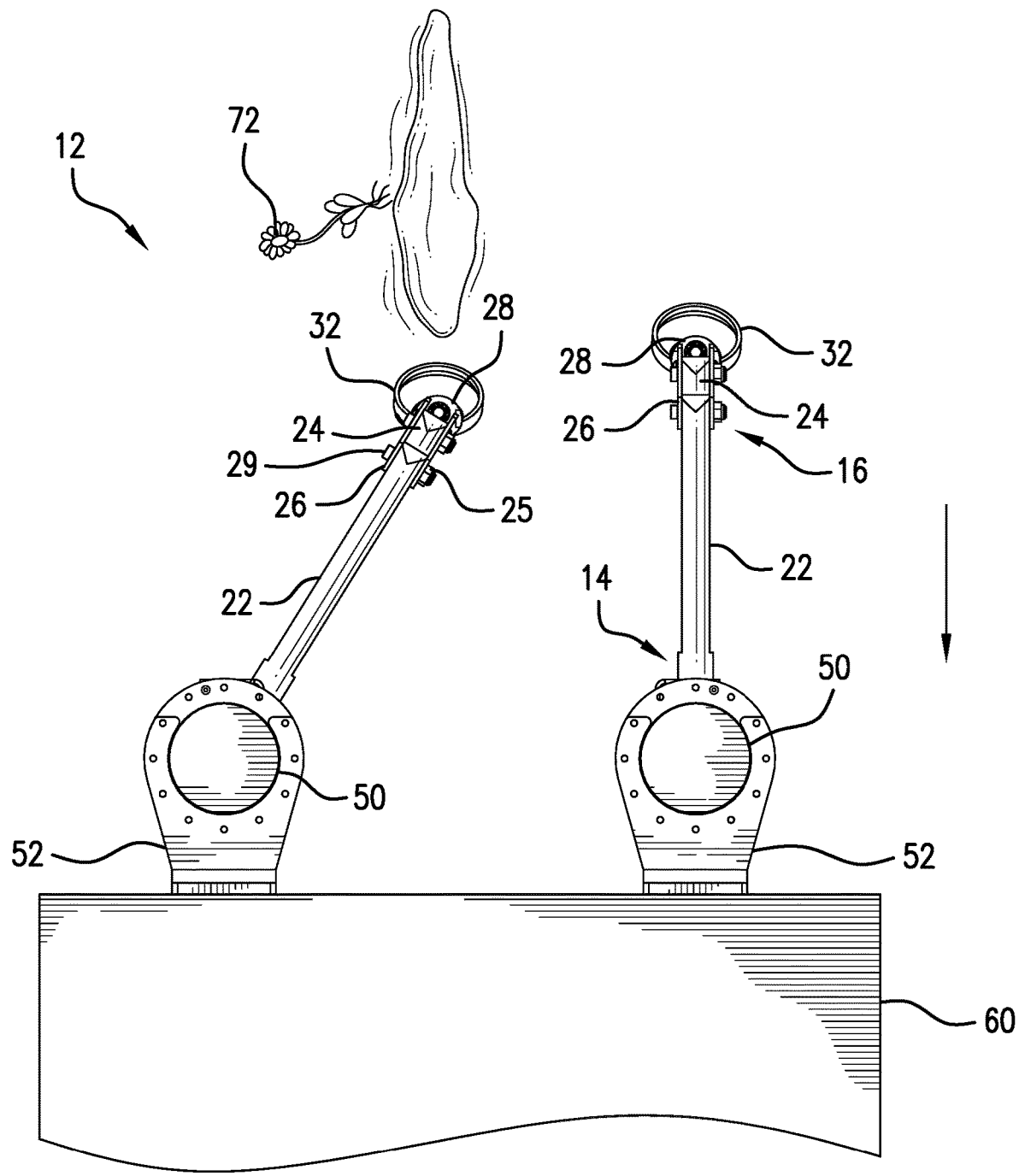
FIG. 16D is another top view of a weed removal system in use in accordance with an example embodiment.

An example of the tool's self-alignment is shown by comparison of FIGS. 2 and 3, 7A and 7B, and may also be seen in FIGS. 16B-16D. Referring to FIG. 2, the tools 32 of both robotic arms are oriented, as dictated by the design, so that the lower, trailing portion of the tool 32 is directly behind the vertical axis, which happens because of a dragging force from contact with the earth, due to the direction of travel of the vehicle 64, which is indicated by the motion arrow. FIGS. 7A and 7B illustrate this principle from another useful perspective. In FIG. 7A, the robotic arm could be traveling toward the viewer, which would result in the orientation of the tool 32 that is shown. If the direction of travel changes as indicated by the arrow in FIG. 7B, the tool 32 would rotate to the position shown.

This alignment of the tool will result in the best cutting action for weed removal, regardless of the direction of travel of the tool 32. FIGS. 16A-16D also show the self-alignment, where the left robotic arm 12 is engaged with the ground upon encountering a weed 72 or other undesirable plant, and the tool 32 assumed an orientation relative to the direction of travel (indicated) to remove the weed. For the tool 32 to caster most effectively, the rotational axis of the tool should be substantially perpendicular to the plane of movement of the tool 32. As described above with regard to the parallel arm assembly 20, the geometric relationship of the robotic arm 12 ensures that the rotational axis of the tool 32 is substantially perpendicular to the surface 70 regardless of the elevation of the parallel arm assembly 20. This angular relationship, which keeps the tool axis perpendicular, is shown in FIG. 6.

Figure 14:
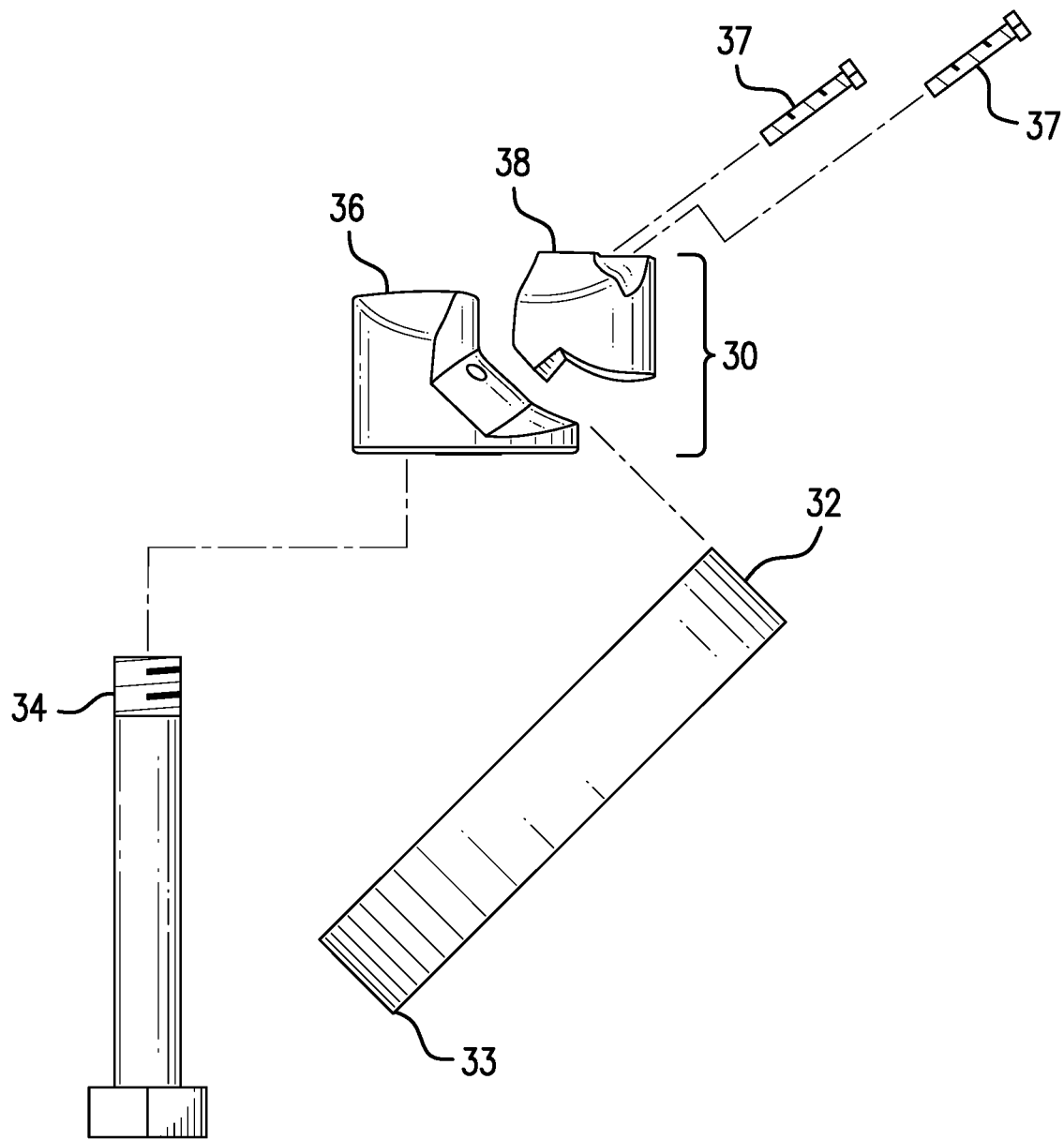
FIG. 14 is an exploded view of a circular hoe usable with a weed removal system in accordance with an example embodiment.

As can be seen in FIG. 14, if the tool used is a circular hoe, it can easily be rotated within tool clamp 30, if desired, so that a sharper portion of the hoe's beveled edge 33 can be used. Such rotation can save time by allowing the circular hoe to be used for a much longer period of time before sharpening is needed. As shown, the hoe can be rotated by removing or loosening fasteners 37, to allow the hoe to rotate between the upper clamp 38 and the lower clamp 36.

Figure 17:
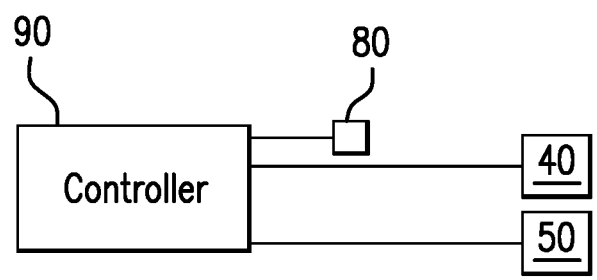
FIG. 17 is simplified block diagram of elements of a weed removal system in accordance with an example embodiment.
Figure 25:
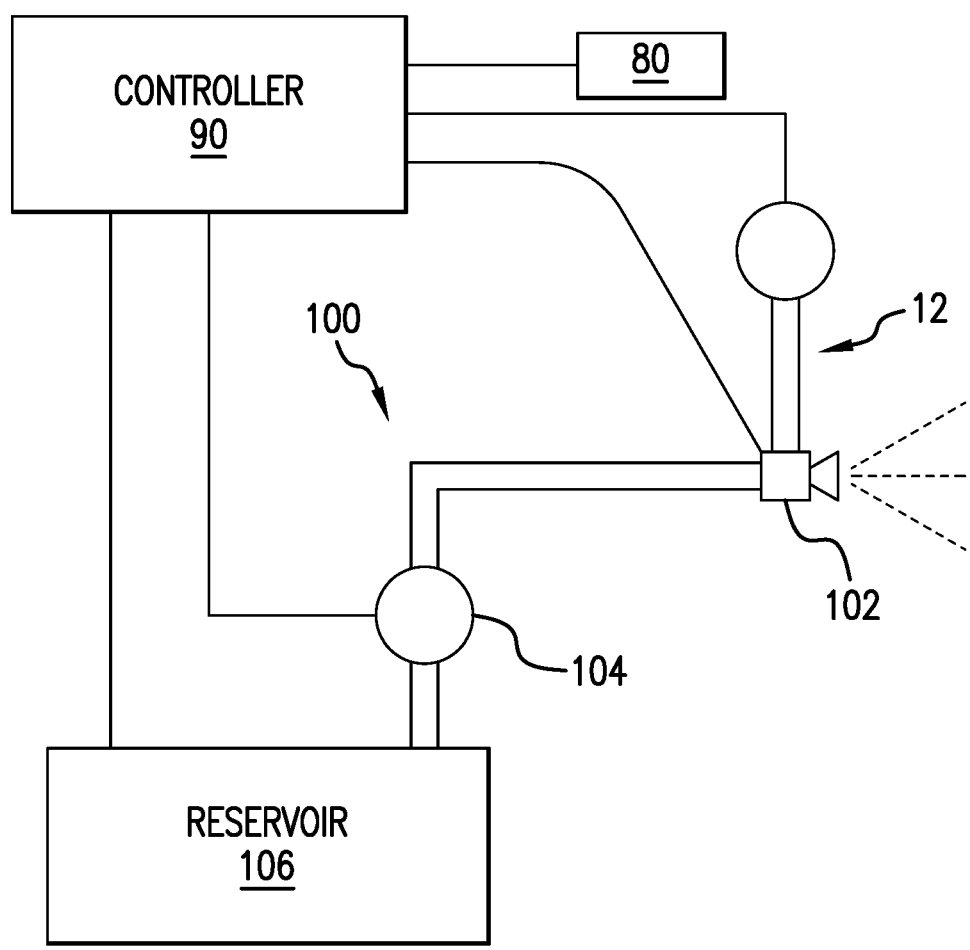
FIG. 25 is simplified block diagram of elements of a weed removal system in accordance with an example embodiment.

If a spray head 102 is used instead of a mechanical tool 32, it can be attached to connecting members 26 by implement holder 28, as shown in FIG. 24. With a spray head 102, it may not be necessary for the spray head 102 to rotate or pivot as with a tool 32, but it is notable that the spray head 102 can be maintained at a constant angle relative to the ground, as with the tool 32 described above. In spray mode, the controller 90 is still connected to sensor 80 and actuators 40, 50 as shown in FIG. 17. In addition, the controller 90 is operatively connected to spray system 100, which can include a reservoir 106 of liquid to be applied to a weed or crop, a pump 104, and spray head 102 on the end of robotic arm 12, as shown in FIG. 25. In addition to controlling the position of spray head 102 in response to manual input or input from sensor 80, the controller 90 can control the pump 104 or a valve on spray head 102 (not shown) to apply a precise amount of chemical to a weed 72, or a crop that needs to be thinned, for example.

E. Actuators.

The robotic arm 12 is controlled by two or more actuators, such as actuators 40 and 50, which are selectively driven by a controller 90, which is operatively connected to actuator 40 and actuator 50, and also receives inputs from any number of sensors 80, as shown for example in FIG. 17. The actuator 40, which raises and lowers the robotic arm 12, may be referred to as a first actuator, and may comprise a first motor, and further, the actuator 50, which may be referred to as a second actuator, may also comprise a motor, which may comprise a second motor. Either actuator may be an electric or hydraulic motor, a servo motor, etc.

The first actuator 40 may be a height-adjustment motor. The actuator 40 works by driving upper member 22 to rotate about the rotational axis of the actuator 40. The first actuator 40 is held stationary relative to the vehicle 64, and coupled to it, by actuator mount 42. As will be described below, the actuator mount 42 is rotationally coupled to the frame 60 of vehicle 64, such that the entire mount 42 and actuator 40 can be rotated to create a side-to-side motion of the tool 32 or spray head 102.

Figure 18:
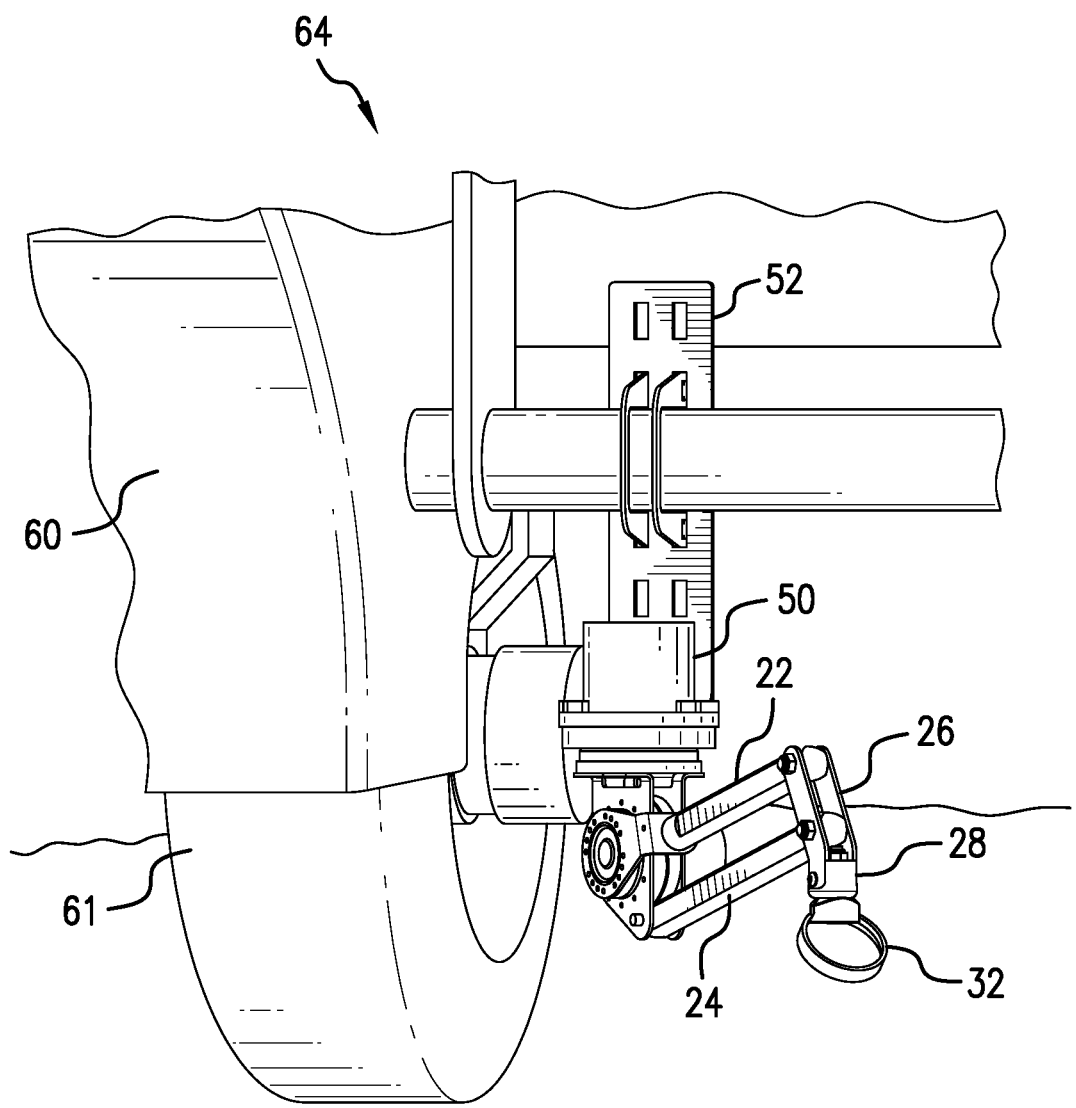
FIG. 18 is a perspective view of a weed removal system in accordance with an example embodiment.
Figure 19:
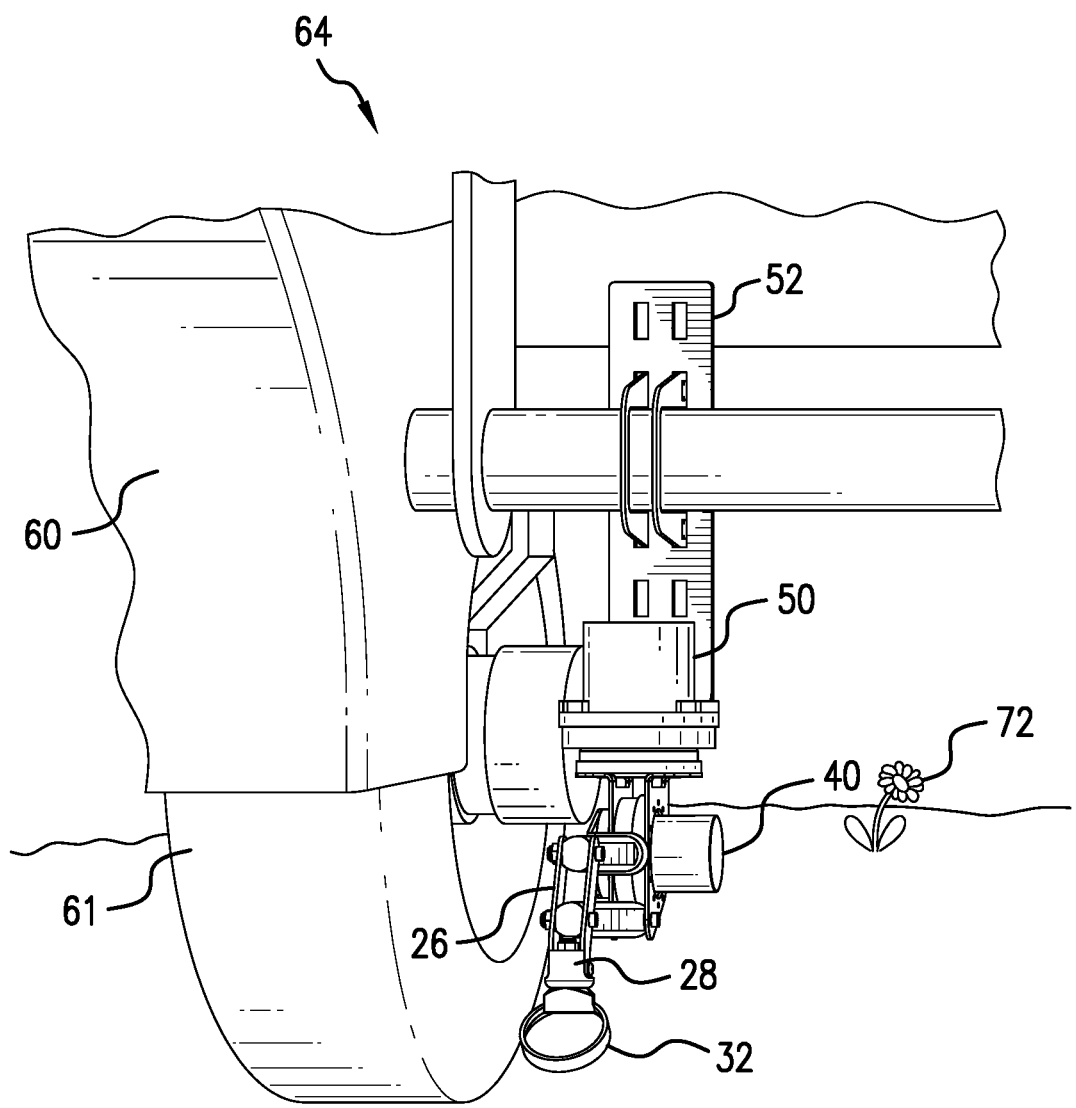
FIG. 19 is another perspective view of a weed removal system in accordance with an example embodiment.
Figure 20:
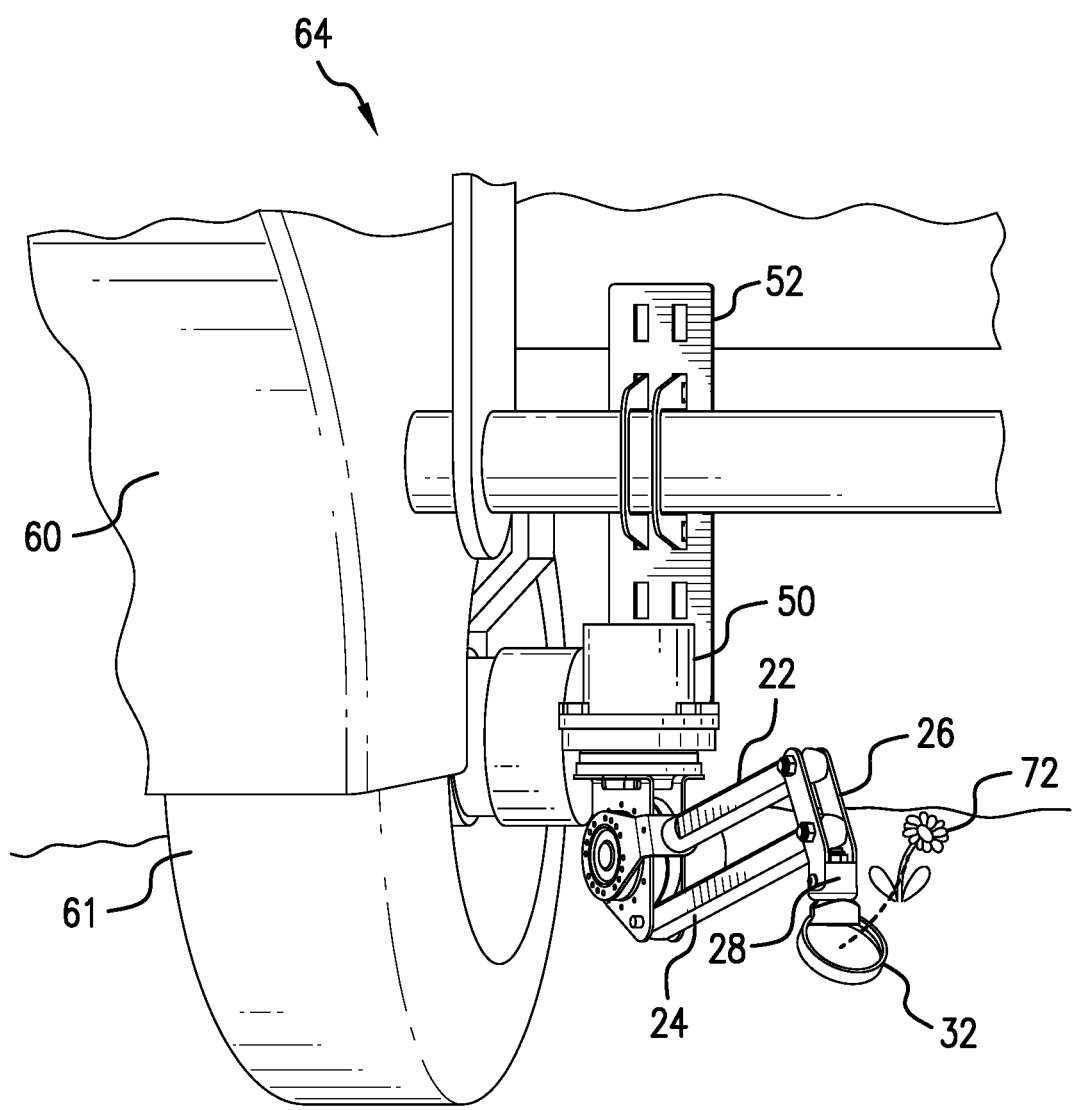
FIG. 20 is another perspective view of a weed removal system in accordance with an example embodiment.

As the vehicle 64 approaches a weed initially, the actuator 40 may be commanded so that the tool 32 is above the surface 70, as shown for example in FIGS. 1A, 18, 19, 20, and 21. Since the weed 72 (or a crop that needs thinning) may be sensed by one or more sensors and its position relative to the robotic arm 12 is known, the first actuator 40 can begin to rotate the upper member 22, and thus the entire parallel arm assembly 20, into position to engage the weed 72, as shown in FIGS. 18 and 20. Actuator 40 can continue to lower the arm 12 until the tool 32 is in position to cut the roots of the weed 72, as shown in FIGS. 1C, 1D and 22-23. While the tool 32 or other implement is engaged with the ground, actuator 40 may continuously adjust the height of the tool 32 relative to the ground contour, to maintain the tool at the optimum cutting depth, or, if a spray head 102 is being used, to maintain the height of the spray head 102 above a weed, crop, or the ground.

Figure 1C:
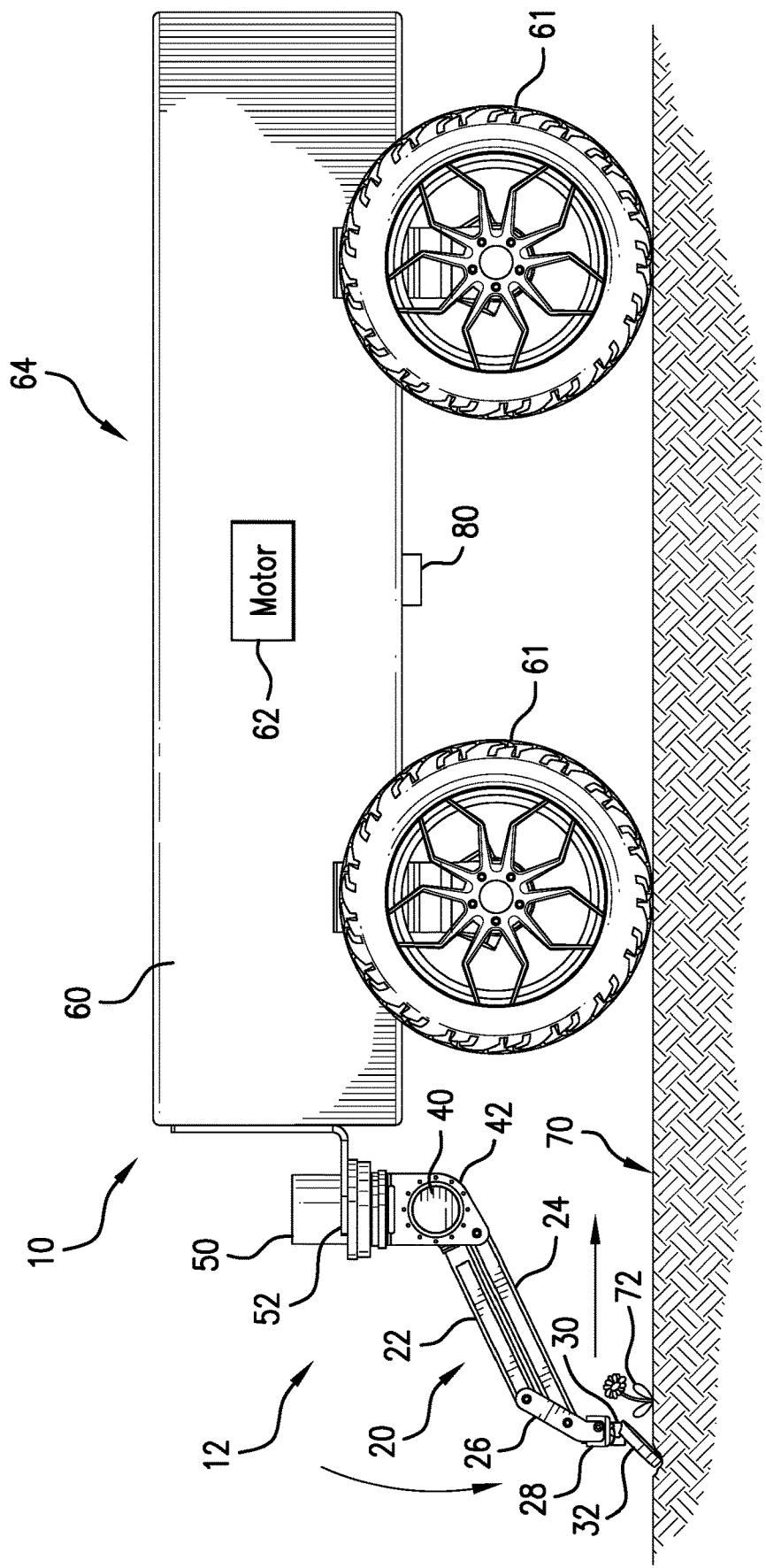
FIG. 1C is another side view of a weed removal system in accordance with an example embodiment.
Figure 1D:
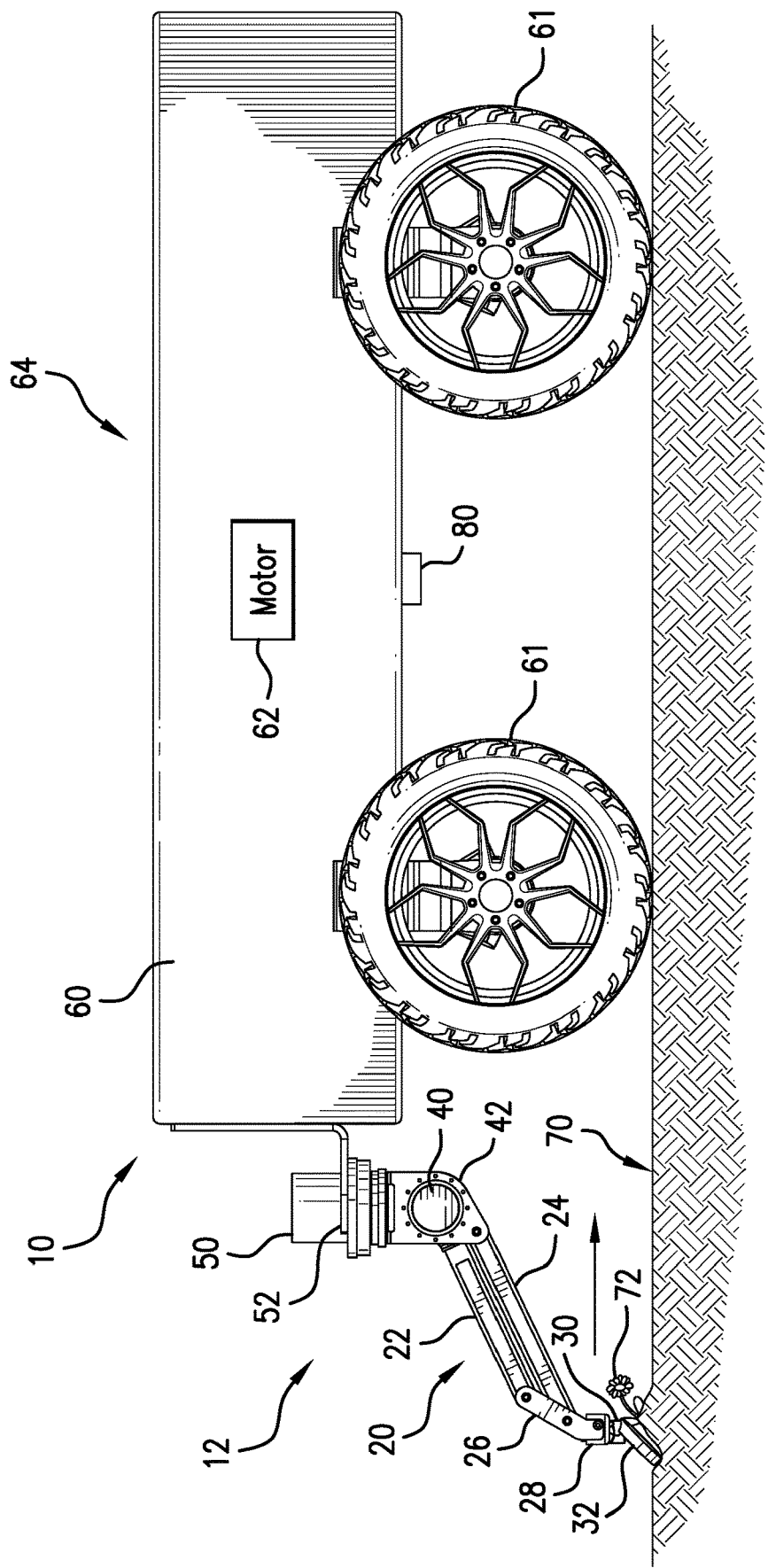
FIG. 1D is another side view of a weed removal system in accordance with an example embodiment.
Figure 1E:
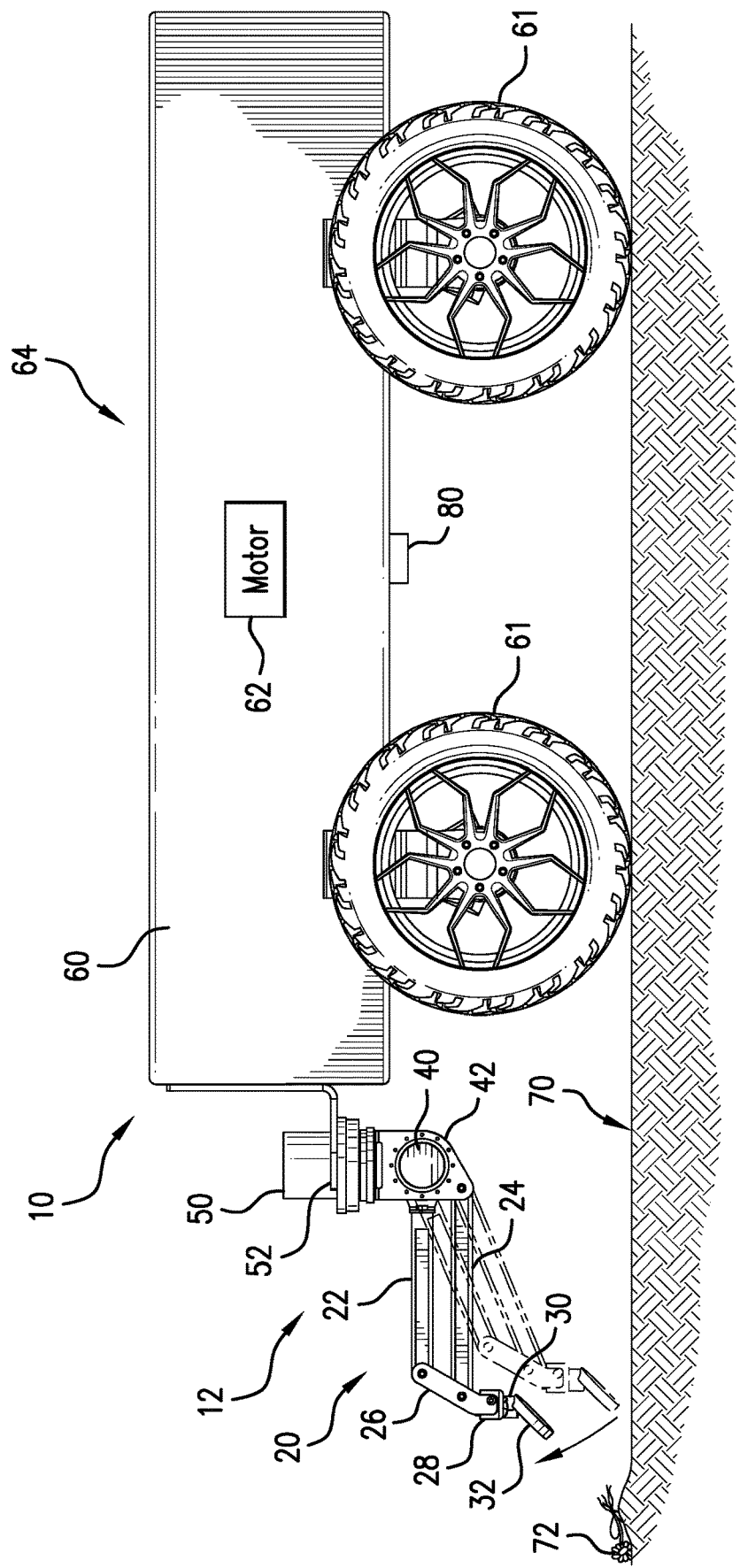
FIG. 1E is another side view of a weed removal system in accordance with an example embodiment.

Next, the first actuator 40 may again be driven to raise the robotic arm 12, as shown in FIG. 1E, as indicated by the arrow. The arm is generally retracted from the dashed position indicated to the solid position shown. Notably, the arm 12 can be raised higher and lowered more than shown if desired or needed, as the illustrations are merely exemplary.

The action just described assumes that a weed 72 is directly in the path of the robotic arm 12 and the tool 32. In such case, all that is required to remove the weed 72 is to lower the arm 12 such that an implement such as tool 32 or spray head 102 engages a weed at the proper location (i.e., before the tool 32 reaches a weed 72), and then, optionally, retracts once the weed 72 has been targeted or removed. Effective weeding could be achieved with a row of robotic arms staggered side by side, and simply raising and lowering each one as required for the most effective results with the least amount of soil disturbance.

However, this approach would not be cost effective; therefore it is desirable for the arm 12 to have 'side-to-side' movement as well. Side-to-side motion is possible due to the rotational axis of the tool 32, which enables the tool 32 to pivot in the direction it is travelling, maintaining its effectiveness. In other words, if the rotational axis of the tool 32 is moved sideways, if the tool 32 is in the soil, it will be aligned with the effective path. However, as the entire apparatus 10 is also moving forward down the row, the effective path of the tool 32 will also depend on this forward motion and the tool will follow the resultant directional vector. If the sideways movement of the tool 32 is significantly faster than the forward travel, this will be the dominant vector and the tool 32 will essentially be moving sideways. However, if the sideways movement of the tool 32 is minor relative to the forward movement of the entire system, the resultant vector and therefore the tool path, will be across the forward movement path.

Figure 15:
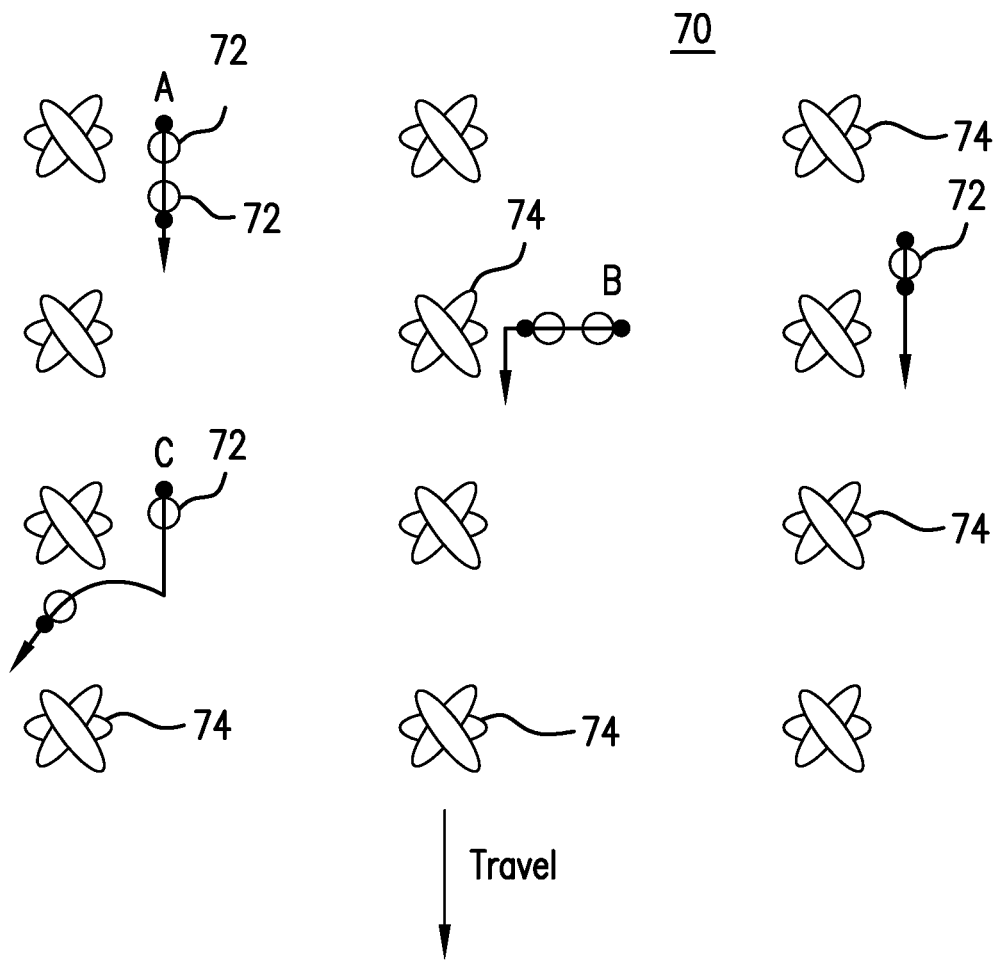
FIG. 15 is a top view of a weed removal pattern achievable with a weed removal system in accordance with an example embodiment.

In FIG. 15, the path marked "C" illustrates one possible complex path. In this case, the tool 32 is lowered prior to reaching the first weed, and the tool path is substantially linear and parallel to the vehicle's path, as dictated by the vehicle's forward motion. This portion of the path results from no or little rotational motion of the arm 12. After the first weed 72 is removed, the arm 12 is rotated fairly rapidly, which results in the second, curved portion of the path, which represents a combination of the forward and sideways motion of the tool 32, used to remove the second weed before the robotic arm 12 is raised in preparation for the next operation. If the tool 32 is still in the soil after any sideways motion has stopped, the tool 32 will then caster in line with the forward movement of the entire system. This is shown, for example, in FIGS. 2 and 3.

Figure 3:
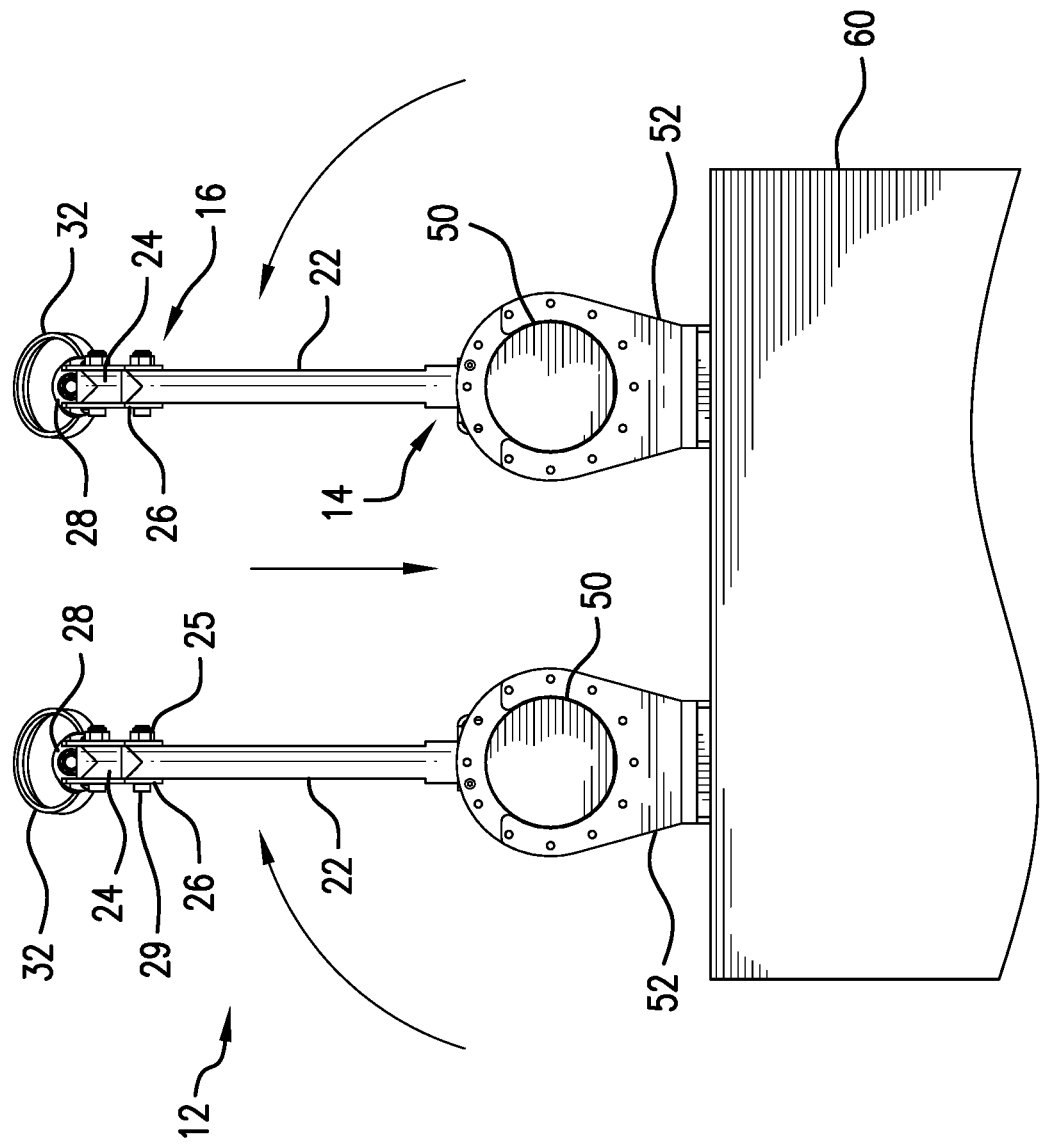
FIG. 3 is another top view of a weed removal system in accordance with an example embodiment.
Figure 4:
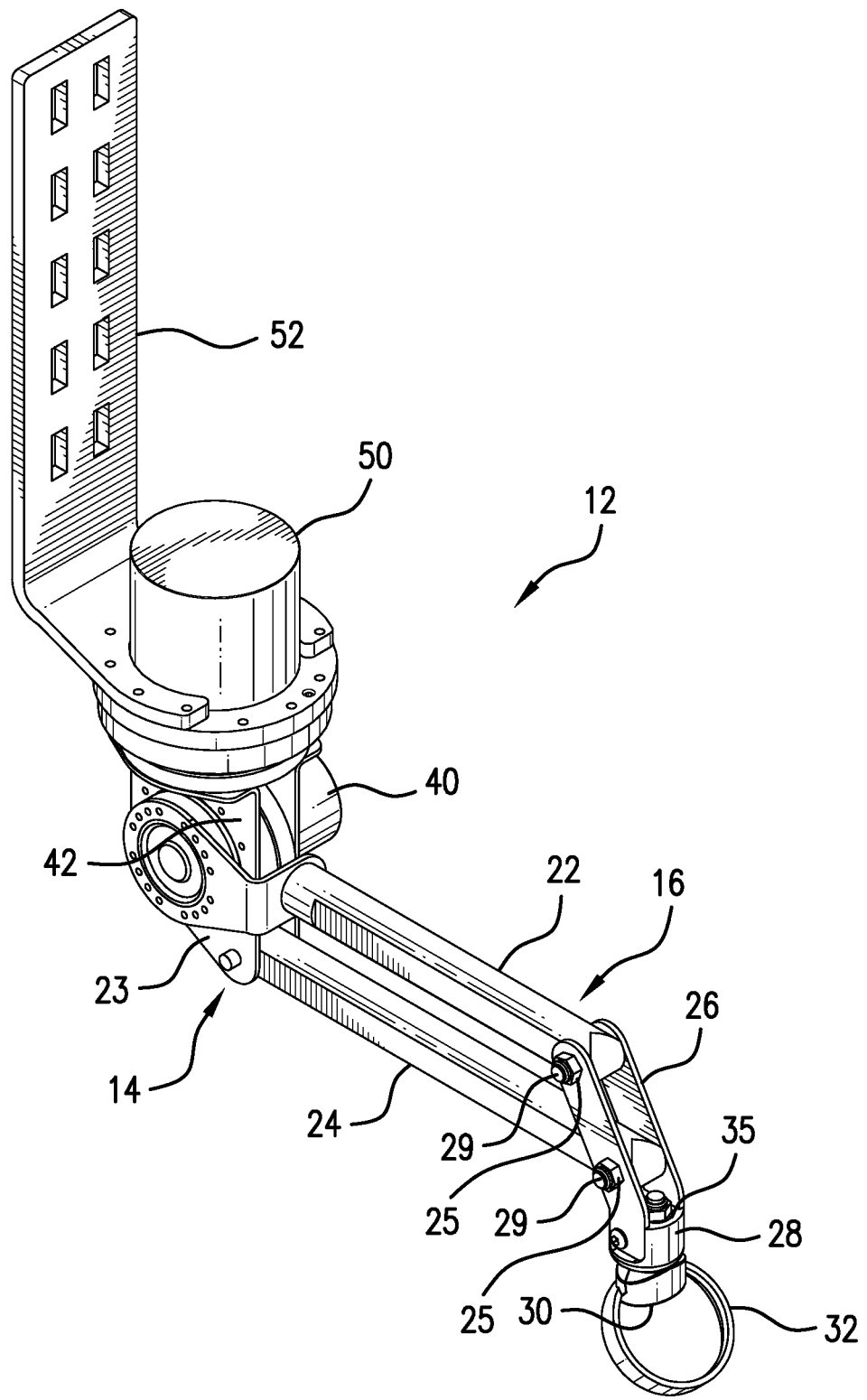
FIG. 4 is a perspective view of a robotic arm usable with a weed removal system in accordance with an example embodiment.
Figure 5:
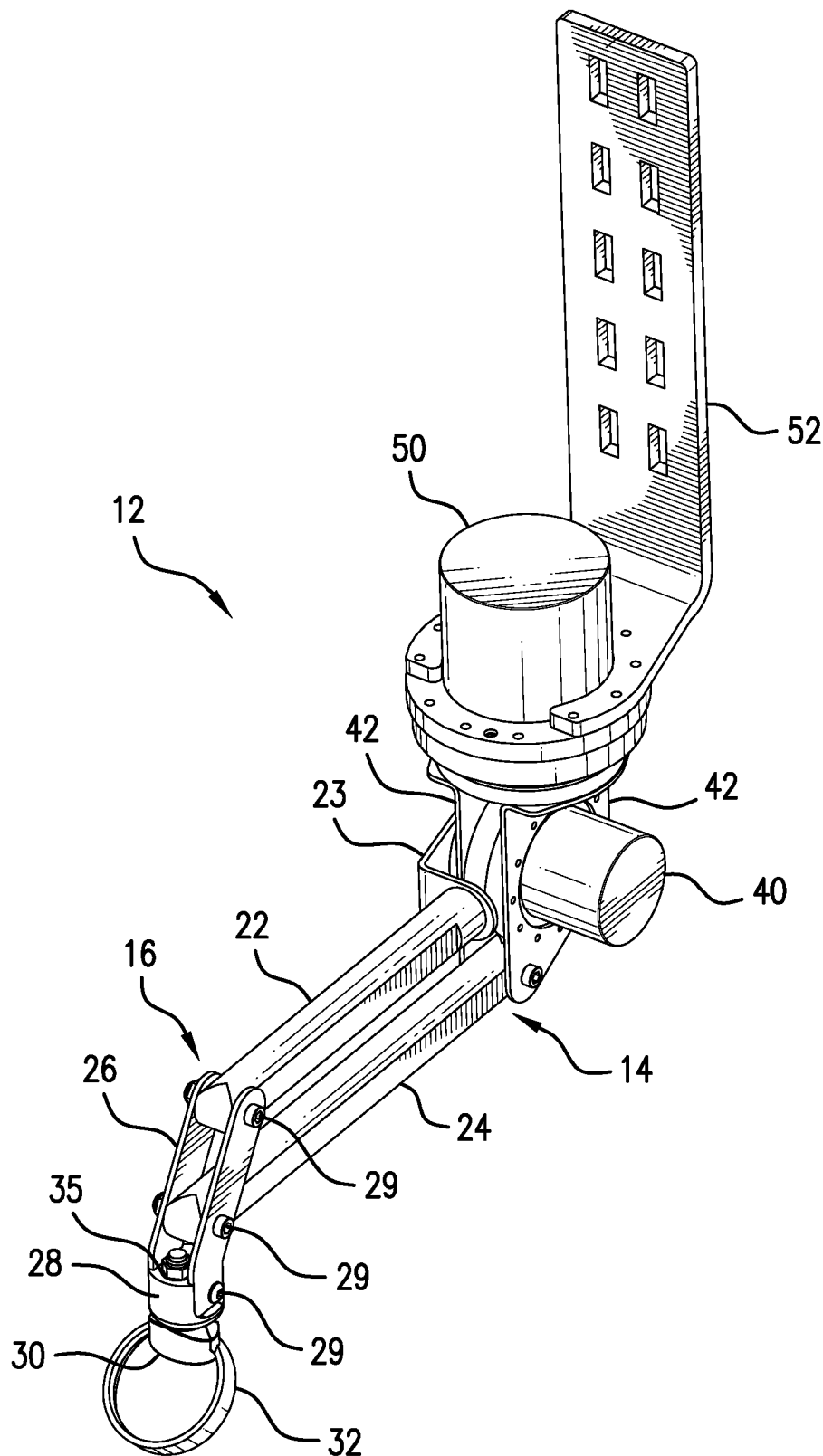
FIG. 5 is another perspective view of a robotic arm usable with a weed removal system in accordance with an example embodiment.

The sideways movement of the arm is accomplished by a second actuator 50, which is coupled to the frame 60 by a rotational actuator mount 52. As shown in FIGS. 2-3 and 16A-16D, the second actuator 50 can cause the entire lower portion of robotic arm 12 to rotate with respect to the vehicle 64 and the frame 60. The first actuator 40 and its mount 42 are rotatable by the second actuator 50. This rotational motion is independent of the elevation of the arm 12 caused by the first actuator 40. The second actuator 50 may be a rotational motor, such as a servo motor, and it may rotate the robotic arm 12 so that, absent motion from the first actuator 40, the tool 32 at the distal portion 16 of arm 12 will move in a plane that is substantially parallel to the ground surface 70, as shown in FIGS. 2-3. In additional to a rotational motor, the second actuator could also be a rack and pinion system, a linear actuator, linear rails, etc.

Notably, a weed or weeds can be engaged and targeted or removed by the tool 32 due to just the rotational motion caused by the second actuator 50 and the elevation caused by first actuator 40. That is, a weed can be removed without any forward movement of the vehicle 64 or frame 60. This is shown, for example, in FIGS. 15 and 20-23, which indicates various simple and complex paths that can be traveled by the tool 32 (or spray head 102) to target and remove weeds. As shown, the tool 32 can remove two (or more) weeds that are located perpendicular to the direction of travel of the vehicle 64, which is indicated by the arrow of the path labeled "B" (in FIG. 15).

F. Operation of Preferred Embodiment.

The ever increasing cost of labor combined with the evolution of technology is making way for economically viable autonomous agricultural robots to replace manual labor. This is specially the case in labor-intensive operations such as cropping. Cropping operations often result in the growth of undesired plants, either in the form of weeds or over-planted crops that are then thinned to the desired spacing after germination. For these cropping operations to be successful, the undesired plants must be removed with minimum disruption to the soil and desired plants. Minimal soil disturbance is essential as dormant weed seeds in the soil can be agitated to a position where they'll germinate, exacerbating the problem.

Existing 'weeding' means on autonomous agricultural robots to date have been either chemical or mechanical. Chemical spray or applicator methods typically have difficulty targeting a specific plant for removal. Further, applying chemicals to crops is undesirable. Existing mechanical means are large and cumbersome, require lots of power to run hydraulics or additional motors, and can be difficult to manipulate around desired plants. Existing systems also disturb more soil than necessary, which is also undesirable. The apparatus 10 provides a simple, effective means of removing undesired plants.

Like existing systems, the tool 32 of the example embodiments could be mounted and continuously dragged through the soil, in a staggered arrangement, to "weed" paths between crop rows as it is pulled forward as part of a tractor implement or autonomous vehicle. However, for achieving minimal soil disturbance, the tool 32, which is rotationally mounted on the distal portion of robotic arm 12, can instead be raised and lowered so as to engage the soil and weeds only when needed. The ability to raise and lower the tool 32 (or other tool) also allows for weeding along the crop row, between crops. This raising and lowering of the tool 32 may be a manual process controlled by an operator, or it may be autonomous, based on a weed detection process or processes (for example, image processing, lidar, etc.) and algorithms that calculate the most effective locations for weeding. The apparatus 10 may also be used in any combination of the above-mentioned methods.

Depending on the vehicle, the vehicle 64 may autonomously propel and direct itself, conduct cropping operations, and communicate data to a remote receiver. Alternatively, an operator may remotely communicate commands to components of the vehicle 64 to propel and/or direct it, and may communicate commands to and receive data from various elements of the vehicle 64, including instruments, measurement devices, and cropping equipment, to conduct cropping operations and receive associated data.

In use, peripheral sensors on the vehicle 64 (not shown) scan and detect the crop rows to enable navigation and general movement of the vehicle 64. Downward facing cameras image the crop bed to generate high-resolution images. Such cameras comprise sensor or sensors 80, for detecting weeds, crops that require removal due to density, and desirable crops 74. Machine learning models use image data to detect individual plants and weeds in the soil.

Figure 22:
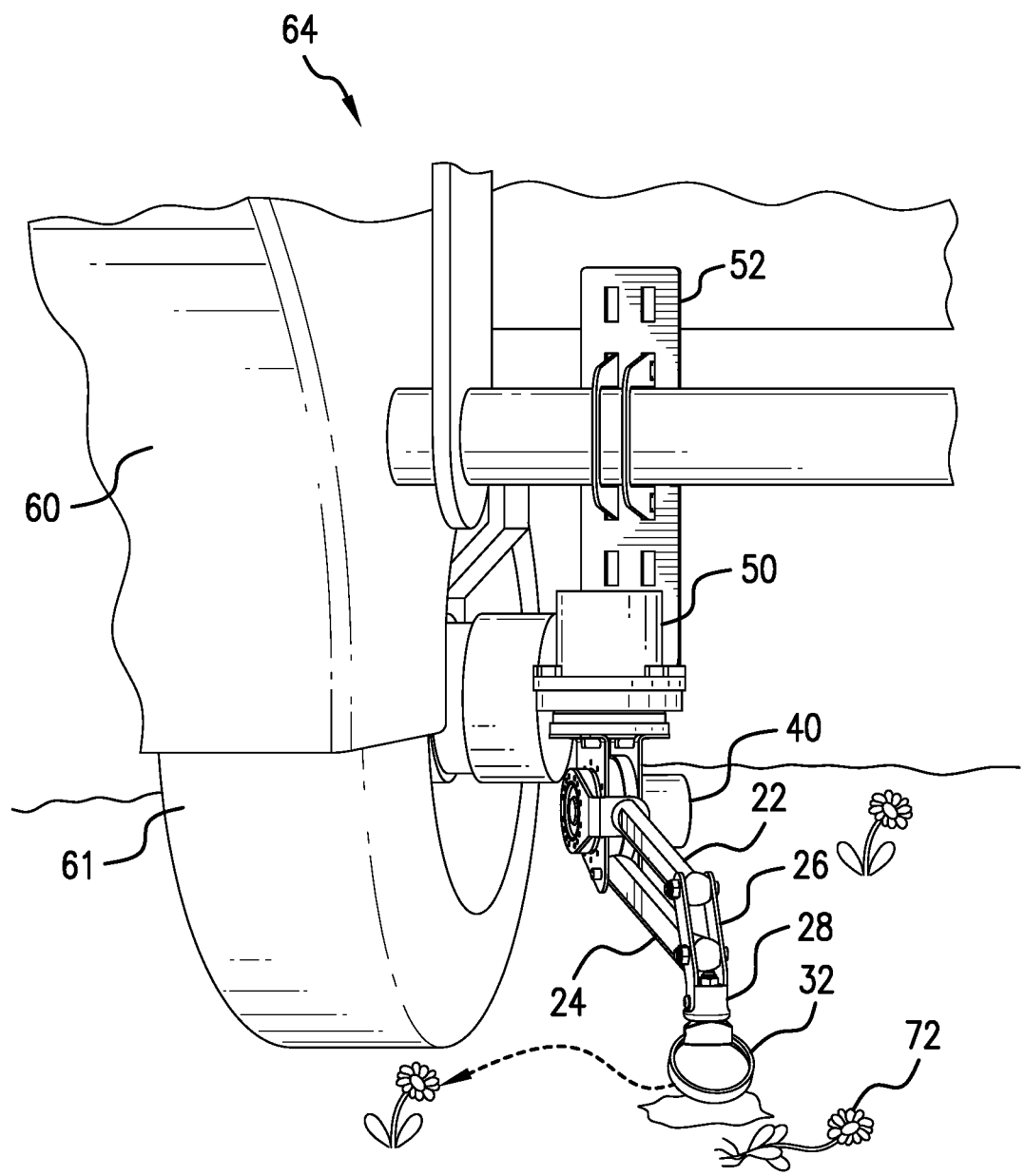
FIG. 22 is another perspective view of a weed removal system in accordance with an example embodiment.

As the vehicle 64 approaches a weed initially, the actuator 40 may be commanded so that the tool 32 is above the surface 70, as shown for example in FIGS. 1A, 16A and 19. Since the weed 72 may be sensed by one or more sensor and its position relative to the robotic arm 12 is known, the first actuator 40 can begin to rotate the upper member 22, and thus the entire parallel arm assembly 20, into position (i.e., downward) to engage the weed 72. Actuator 40 can continue to lower the arm 12 until the tool 32 is in position to cut the roots of the weed 72, as shown in FIGS. 1C, 1D and 22. Actuator 40 may then make height adjustments to maintain the tool 32 at the desired depth relative to the surface contour. The weeding operation may also require operation of the second actuator 50, to rotate one or more robotic arms 12 as needed to engage a weed or weeds.

An example of such rotation is shown in FIGS. 16A-16D and 20-23. FIG. 16A indicates the position of the left-most (viewed from above) robotic arm 12 before motion begins. FIGS. 16A-16D illustrate two independently operable robotic arms 12 mounted on a vehicle frame 60. More or fewer robotic arms 12 could also be used. The number of arms used can be made to ensure that, due to the rotational actuation, a tool 32 of the system can reach any weed across the width of the seed bed. It may be noted that a single robotic arm 12 with a large sweep which covers the entire width of the seed bed could be used. However, such an arrangement will be slower and less versatile than one with multiple robotic arms 12 and tools 32 used together in a coordinated fashion. The tool 32 can be moved left to right, and can also be raised and lowered. As it moves, it will self-align to the resulting trajectory due to the offset between the lower edge of tool 32 and its rotational axis.

The subsequent motion needed to engage weed 72 is indicated by the arrow (FIGS. 16A-16B), which is a clockwise rotation driven by the second actuator 50. At the same time, the first actuator 40 may begin lowering the tool 32, as described above. These actions may all take place while the vehicle 64 and frame 60 are moving, as indicated by the straight arrow in FIG. 16A. They may also occur while the vehicle 64 is stationary, or moving at different speeds to allow removal of weeds in virtually any position. Note that the drawings are not necessarily to scale, especially regarding weed and plant spacing, which may be changed for purposes of illustration. Next, as shown in FIG. 16B, the robotic arm 12 has been moved into position rotationally as indicated by the curved arrow, so that the tool 32 is aligned with the weed 72. As also shown, the arm 12 has also been lowered, as the tool 32 has begun dragging through the soil, as indicated by the divot. The tool 32 is thus lowered below the soil surface so that is can be pulled through the undesired plant or weed's root system. The circular shape is highly efficient for entering the soil resulting in minimal soil disturbance.

As the vehicle 64 continues its travel, the tool 32 is pulled through the root system of weed 72, as shown in FIG. 16C. The tool depth may be monitored and any contours in the surface may be compensated for through height adjustment of the tool 32. The tool 32 dislodges the root system, and the weed 72 is left behind or to the side of the tool's path, as shown in FIG. 16D. As mentioned, the apparatus 10 can be used to remove weeds along different paths, not just those in a straight line along the vehicle's path of travel.

Several possibilities are illustrated in FIG. 15. For example, in the path marked "A", the tool 32 is simply positioned in line with two weeds that happen to be aligned with the direction of the vehicle's travel. In this case, a robotic arm 12 is rotated, if necessary, to align tool 32 with the weeds, and the tool 32 is lowered before it reaches the first weed 72, and is raised shortly after passing the second weed 72. Due to the motion of the vehicle, the vehicle itself pulls the tool along the desired trajectory.

In the path marked "B", the tool is positioned to the side of two weeds 72, and is again lowered at an appropriate distance from the first weed (i.e., the one on the right in the figure), and the second actuator 50 is driven so that the tool 32 is quickly swiped sideways to remove both weeds 72. After this, the actuator 40 is used to once again raise the robotic arm 12. If necessary, the speed of vehicle 64 over the surface 70 can be changed to facilitate the action just described. As an example, the vehicle 64 can be slowed or even stopped to facilitate efficient removal of weeds positioned as shown. Again, due to the caster-like operation of tool 32, the tool 32 will align itself with the overall direction of travel along any path shown in FIG. 15—A, B, or C.

Figure 21:
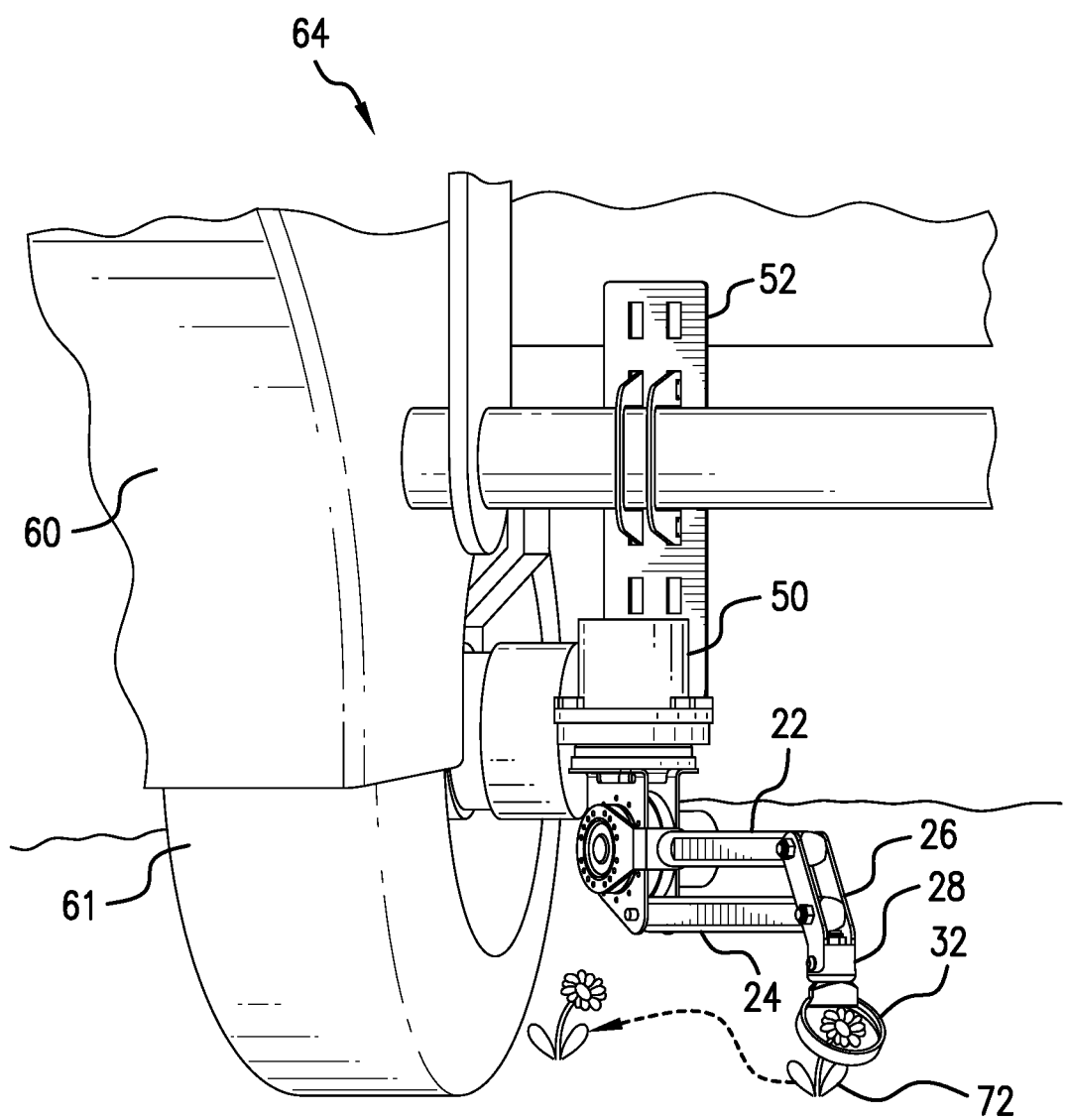
FIG. 21 is another perspective view of a weed removal system in accordance with an example embodiment.
Figure 23:
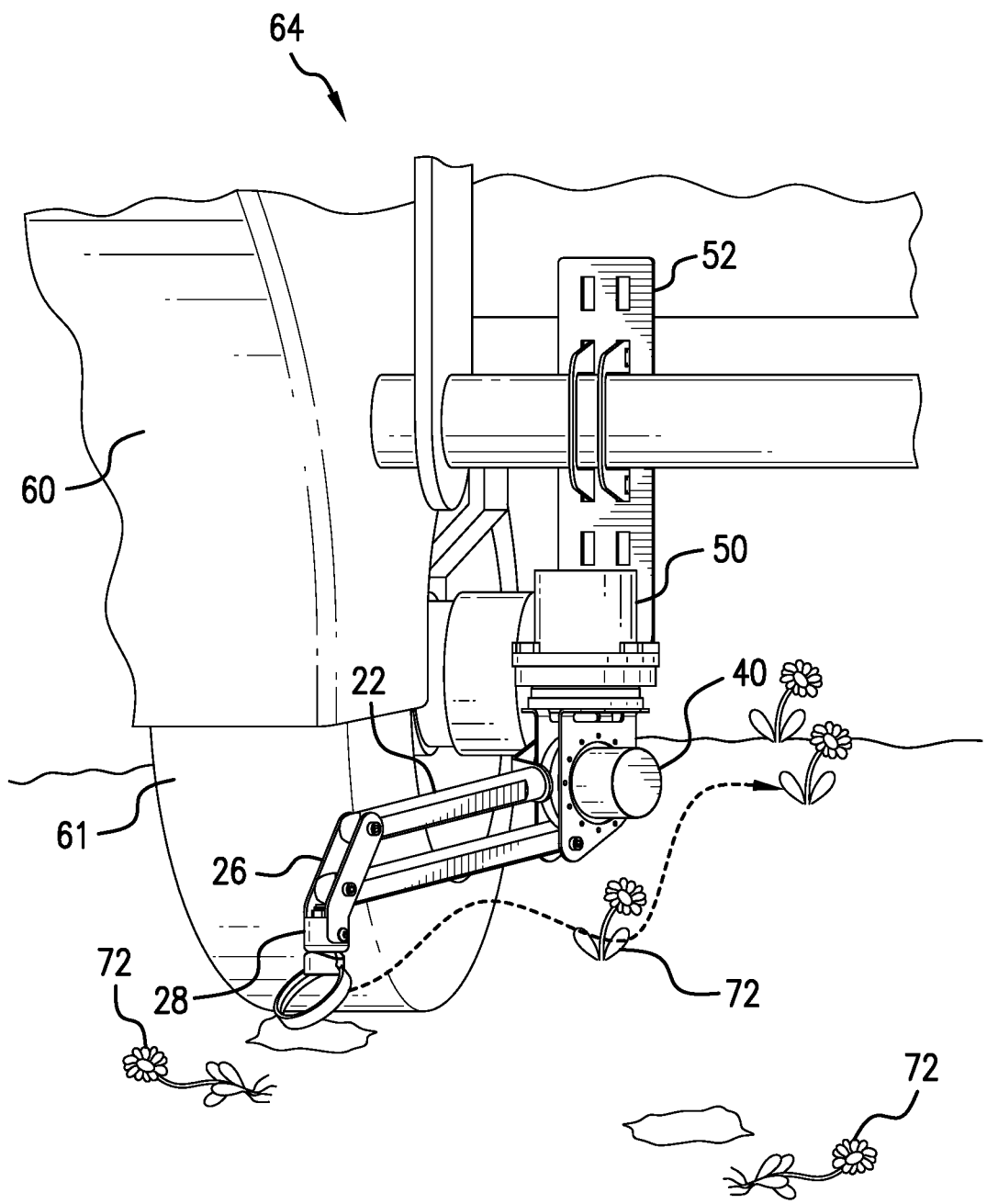
FIG. 23 is another perspective view of a weed removal system in accordance with an example embodiment.

The path marked "C" in FIG. 15 is a combination of the two operations just described. In this case, the tool 32 is lowered prior to reaching the first weed, and the vehicle's forward motion removes the first weed. Then, the tool 32 is swiped left to target/remove the second weed before the robotic arm 12 is raised in preparation for the next operation. Perspective views of some exemplary complex paths possible for tool 32 or spray head 102 (not shown) are illustrated in FIGS. 21-23.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A weed removal apparatus, comprising:
    a robotic arm coupled to a frame of a vehicle that has a plurality of ground engaging members that move the vehicle over a surface, wherein the robotic arm includes:
        an upper member having a proximal end, a distal end, and a first length;
        a lower member positioned in parallel with the upper member, the lower member having a proximal end, a distal end, and a second length that is longer than the first length;
        a member oriented at a non-vertical angle relative to the surface to which the distal end of the upper member and the distal end of the lower member are pivotally coupled; and
        an actuator to which the proximal end of the upper member and the proximal end of the lower member are pivotally coupled; and
    a weed-removal implement connected to the member and having a beveled cutting edge;
    wherein the weed-removal implement is raised above the surface and lowered below the surface by the actuator of the robotic arm enabling the beveled cutting edge of the weed-removal implement to cut a root of the weed as the vehicle moves over the surface.

2. The weed removal apparatus of claim 1, wherein the weed-removal implement is a tool that comprises a flat ring shape.

3. The weed removal apparatus of claim 2, wherein the tool is coupled to the robotic arm by a clamp that enables rotational repositioning of the tool in the clamp.

4. The weed removal apparatus of claim 1, wherein a proximal portion of the robotic arm is rotationally coupled to the frame enabling movement of, the weed-removal implement in a plane parallel to the surface.

5. The weed removal apparatus of claim 1, wherein the robotic arm is operably coupled to a controller that executes instructions to raise and lower the robotic arm.

6. The weed removal apparatus of claim 5, wherein the robotic arm is also rotationally coupled to the frame enabling movement of, the weed-removal implement in a first plane when the robotic arm is raised and lowered and enabling movement of the implement in a second plane when the robotic arm is rotated;
    wherein the controller further executes instructions to rotate the robotic arm with a second actuator.

7. The weed removal apparatus of claim 5, further comprising a sensor operably coupled to the controller, wherein the sensor senses the presence of a weed, wherein the controller, responsive to the sensor sensing the presence of the weed, executes instructions to raise and lower the robotic arm enabling targeting of the weed by the weed-removal implement.

8. The weed removal apparatus of claim 7, wherein the controller executes instructions to rotate the robotic arm enabling targeting of the weed by the weed-removal implement.

9. A weed removal apparatus, comprising:
    a robotic arm comprising a distal portion and a proximal portion coupled to a frame of a vehicle having a plurality of ground engaging members that move the vehicle over a surface;
    a first actuator coupled to the proximal portion of the robotic arm, wherein the first actuator raises and lowers the distal portion of the robotic arm;

a second actuator coupled to the proximal portion of the robotic arm, wherein the second actuator rotates the robotic arm; and a weed-removal implement connected to the distal portion of the robotic arm and having a beveled cutting edge;

wherein the weed-removal implement is raised and lowered in a first plane by the first actuator;

wherein the weed-removal implement is moved in a second plane by the second actuator; and wherein the weed-removal implement is raised above the surface and lowered below the surface by the actuator of the robotic arm enabling the beveled cutting edge of the weed-removal implement to cut a root of the weed as the vehicle moves over the surface.

10. The weed removal apparatus of claim 9, wherein the first actuator comprises a first motor, and wherein the second actuator comprises a second motor.

11. The weed removal apparatus of claim 9, wherein the robotic arm comprises an upper member and a lower member, the upper member and the lower member pivotally coupled to the frame at the proximal portion and pivotally connected to a connecting member at the distal portion such that the upper member and the lower member remain parallel to each other when the robotic arm is raised and lowered;

wherein the implement is coupled to the connecting member; and wherein an angle of the connecting member relative to the surface does not change when the robotic arm is raised and lowered.

12. The weed removal apparatus of claim 9, wherein the weed-removal implement comprises a tool that is pivotally connected to the distal portion of the robotic arm.

13. The weed removal apparatus of claim 12, wherein the tool pivots about a vertical axis and wherein a lower end of the tool is offset from the vertical axis enabling pivoting of the tool as a result of a force on the lower end of the tool when the tool is in contact with the surface and is in motion relative to the surface.

14. A weed removal apparatus, comprising:

a robotic arm comprising a distal portion and a proximal portion coupled to a frame of a vehicle that includes a motor and a plurality of ground engaging member that propel the vehicle over a surface, wherein the robotic arm comprises an upper member and a lower member, the upper member and the lower member pivotally coupled to the frame at the proximal portion and pivotally connected to a connecting member at the distal portion such that the upper member and the lower member remain parallel to each other when the robotic arm is raised and lowered;

a tool having a flat ring shape coupled to a shaft that is rotationally, connected to the connecting member, wherein the tool includes a beveled cutting edge;

a controller operably coupled to the robotic arm and to a sensor that senses the presence of a weed;

a first actuator coupled to the proximal portion of the robotic arm, wherein the first actuator raises and lowers the distal portion of the robotic arm as commanded by the controller to remove the weed; and a second actuator coupled to the proximal portion of the robotic arm, wherein the second actuator rotates the robotic arm as commanded by the controller to remove the weed;

wherein the tool is raised and lowered in a first plane by the first actuator;

wherein the tool is moved in a second plane by the second actuator;

wherein an angle of the connecting member relative to the surface does not change when the robotic arm is raised and lowered; and wherein the weed-removal implement is raised above the surface and lowered below the surface by the actuator of the robotic arm enabling the beveled cutting edge of the weed-removal implement to cut a root of the weed as the vehicle moves over the surface.

\* \* \* \* \*